United States Patent
Lin et al.

(10) Patent No.: US 9,166,677 B2
(45) Date of Patent: Oct. 20, 2015

(54) METHOD AND APPARATUS FOR ASSOCIATING A RELAY IN WIRELESS COMMUNICATIONS

(75) Inventors: Dexu Lin, San Diego, CA (US); Tingfang Ji, San Diego, CA (US); Wanshi Chen, San Diego, CA (US); Jaber Mohammad Borran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 679 days.

(21) Appl. No.: 13/008,306

(22) Filed: Jan. 18, 2011

(65) Prior Publication Data

US 2011/0199919 A1 Aug. 18, 2011

Related U.S. Application Data

(60) Provisional application No. 61/296,281, filed on Jan. 19, 2010.

(51) Int. Cl.
*H04W 24/00* (2009.01)
*H04B 7/26* (2006.01)
*H04B 7/155* (2006.01)
*H04W 40/22* (2009.01)
*H04B 17/327* (2015.01)
(Continued)

(52) U.S. Cl.
CPC .............. *H04B 7/2606* (2013.01); *H04B 7/155* (2013.01); *H04B 7/15542* (2013.01); *H04B 17/327* (2015.01); *H04B 17/382* (2015.01); *H04B 17/40* (2015.01); *H04W 40/22* (2013.01)

(58) Field of Classification Search
CPC .. H04B 7/2606; H04B 7/155; H04B 17/0045; H04B 17/0077; H04B 17/02; H04W 40/00
See application file for complete search history.

(56) References Cited

U.S. PATENT DOCUMENTS 5,809,430 A * 9/1998 D'Amico ................. 455/525
6,754,493 B1 * 6/2004 Jetzek ...................... 455/436
7,389,111 B2 * 6/2008 Petrus ....................... 455/436
(Continued)

FOREIGN PATENT DOCUMENTS

CN 1897576 A 1/2007
EP 0566551 A2 10/1993
(Continued)

OTHER PUBLICATIONS

Zhu et al., "A Novel Downlink Adaption Scheme for TDD Type-II Relay Systems", IEEE, ICMTMA, 2011 Third INternaltional Conference (vol. L1), Jan. 6-7, 2011, p. 191-194.*
(Continued)

*Primary Examiner* — Brian J Gillis
*Assistant Examiner* — Amy Ling
(74) *Attorney, Agent, or Firm* — Michael J. DeHaemer, Jr.

(57) ABSTRACT

Methods and apparatuses are provided that facilitate associating with relays in a wireless network. A device can select whether to utilize relay assistance where present based at least in part on measuring one or more determined or projected parameters related to the relay. Where utilizing a relay results in user-plane data channel conditions above a threshold level and control channel conditions below a threshold level, a serving base station can determine whether to employ another base station to serve the device, jointly serve a relay with an additional base station, and/or the like.

25 Claims, 18 Drawing Sheets

(51) Int. Cl.
*H04B 17/382* (2015.01)
*H04B 17/40* (2015.01)

(56) References Cited

U.S. PATENT DOCUMENTS

| | | | |
|---|---|---|---|
| 7,853,202 B1* | 12/2010 | Visotsky et al. | 455/9 |
| 8,228,869 B2* | 7/2012 | Ahluwalia | 370/331 |
| 8,300,570 B2* | 10/2012 | Zhang et al. | 370/315 |
| 8,369,239 B2* | 2/2013 | Ishii et al. | 370/252 |
| 8,379,578 B2 | 2/2013 | Gorokhov et al. | |
| 8,417,255 B2* | 4/2013 | Dayal et al. | 455/452.2 |
| 2003/0092461 A1 | 5/2003 | Moulsley et al. | |
| 2004/0192204 A1 | 9/2004 | Periyalwar et al. | |
| 2004/0229563 A1* | 11/2004 | Fitton et al. | 455/7 |
| 2007/0015461 A1 | 1/2007 | Park et al. | |
| 2007/0097914 A1* | 5/2007 | Grilli et al. | 370/329 |
| 2007/0223374 A1 | 9/2007 | Popovski et al. | |
| 2007/0274343 A1* | 11/2007 | Nishio | 370/479 |
| 2008/0096569 A1* | 4/2008 | Khandekar et al. | 455/442 |
| 2008/0188234 A1 | 8/2008 | Gorokhov et al. | |
| 2009/0219852 A1* | 9/2009 | Youn et al. | 370/315 |
| 2010/0177736 A1* | 7/2010 | Wang et al. | 370/331 |
| 2011/0081903 A1* | 4/2011 | Cai et al. | 455/424 |
| 2011/0190003 A1* | 8/2011 | Hiltunen et al. | 455/452.1 |
| 2011/0199975 A1* | 8/2011 | Wu | 370/328 |
| 2011/0317635 A1* | 12/2011 | Swaminathan | 370/329 |
| 2012/0127888 A1* | 5/2012 | Fujishima et al. | 370/252 |

FOREIGN PATENT DOCUMENTS

| | | |
|---|---|---|
| EP | 1744502 A1 | 1/2007 |
| GB | 2433179 A | 6/2007 |
| JP | 2007165980 A | 6/2007 |
| JP | 2011514031 A | 4/2011 |
| KR | 20040053233 A | 6/2004 |
| KR | 20080067815 A | 7/2008 |
| WO | WO-2007125593 A1 | 11/2007 |
| WO | 2008004806 A1 | 1/2008 |
| WO | WO-2008023814 A2 | 2/2008 |
| WO | WO-2008052012 A2 | 5/2008 |
| WO | WO-2008070518 A2 | 6/2008 |
| WO | WO-2009092155 A1 | 7/2009 |
| WO | WO-2009097070 A1 | 8/2009 |
| WO | 2010048440 | 4/2010 |
| WO | WO2011020062 A2 | 2/2011 |

OTHER PUBLICATIONS

Fujitsu, "Considerations on using type 2 relay for UL transmission", Nov. 9-13, 2009, 3GPP TSG-RAN1 #59.*
Alcatel-Lucent, CHTTL, "System Design Frameworks to Support Type II Relay Operation in LTE-A", 3GPP TSG RAN WG1 #57, R1-092157, May 4-8, 2009.*
Alcatel-Lucent Shanghai Bell, "DL Performance evaluation for LTE-Advanced Type II relay", 3GPP TSG RAN WG1 Meeting #59, R1-094633, Nov. 9-13, 2009.*
International Search Report and Written Opinion—PCT/US2011/021670—ISA/EPO—Nov. 11, 2011.
Partial International Search Report—PCT/US2011/021670, ISA/EPO—Jul. 21, 2011.
Jungnickel .V, et al., "Implementation concepts for distributed cooperative transmission", Signals, Systems and Computers, 2008 42nd Asilomar Conference on, IEEE, Piscataway, NJ, USA, Oct. 26, 2008, pp. 1035-1039, XP031475445, ISBN: 978-1-4244-2940-0.
Taiwan Search Report—TW100101990—TIPO—Jul. 8, 2013.
3GPP TS 36.201 V10.0.0 (Dec. 2010), "3rd Generation Partnership Project; Technical Specification Group Radio Access Network; Evolved Universal Terrestrial Radio Access (E-UTRA); LTE physical layer; General description (Release 10)", 13 pages.
3GPP TS 36.216, "3rd Generation Partnership Project; Technical Specification Group Radio Access Network; Evolved Universal Terrestrial Radio Access (E-UTRA); Physical layer for relaying operation (Release 10)", Sep. 2010, V10.0.0, 12 pages.

* cited by examiner

METHOD AND APPARATUS FOR ASSOCIATING A RELAY IN WIRELESS COMMUNICATIONS

CLAIM OF PRIORITY UNDER 35 U.S.C. §119

The present Application for Patent claims priority to Provisional Application No. 61/296,281 entitled "UE ASSOCIATION WITH TYPE II RELAYS" filed Jan. 19, 2010, and assigned to the assignee hereof and hereby expressly incorporated by reference herein.

BACKGROUND

1. Field

The following description relates generally to wireless network communications, and more particularly to utilizing a relay in wireless communications.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In addition, relays can be provided to augment network coverage and capacity. For example, relays generally receive signals from a base station, and transmit the received signals to improve signal quality with a combined signal received at a device. Some relays can operate without a physical cell identifier, and thus do not require separate control data resources with a device to relay base station communications (e.g., a type II relay in LTE). In this example, the device communicates control data with the base station, but not the relay, while receiving user-plane data from both. This can result in incongruity between channel quality for control and user-plane data. In one example, the device can experience a high quality user-plane data channel and a low-quality control channel where the device is near the relay, but further from the base station. This can prevent the device from decoding the user-plane data channel, in one example, where control channel quality is below a threshold level. Moreover, for example, the device can be near a neighboring base station that interferes with the serving base station, which can further decrease hearability of the control channel from the serving base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating selecting a serving cell and/or relay based at least in part on measured channel conditions from the serving cell and/or relay. In addition, aspects are described in connection with utilizing a relay to communicate with a device where the device experiences channel conditions below a threshold level from a serving base station. In one example, a serving base station can additionally or alternatively employ a different base station along with the relay to communicate with the device based at least in part on the channel conditions.

According to an example, a method for determining whether to receive signals from a relay is provided including determining one or more communication parameters related to a base station and determining one or more different communication parameters related to a relay assisting the base station. The method further includes selecting to receive signals from the base station with or without assistance from the relay based at least in part on comparing the one or more communication parameters with the one or more different communication parameters.

In another aspect, an apparatus for determining whether to receive signals from a relay is provided that includes at least one processor configured to obtain one or more communication parameters related to a base station and obtain one or more different communication parameters related to a relay assisting the base station. The at least one processor is further configured to determine to receive signals from the base station with or without assistance from the relay based at least in part on comparing the one or more communication parameters with the one or more different communication parameters. In addition, the apparatus includes a memory coupled to the at least one processor.

In yet another aspect, an apparatus for determining whether to receive signals from a relay is provided that includes means for determining one or more communication parameters related to a base station and one or more different communication parameters related to a relay assisting the base station. The apparatus further includes means for selecting to receive signals from the base station with or without assistance from the relay based at least in part on comparing the one or more communication parameters with the one or more different communication parameters.

Still, in another aspect, a computer-program product is provided for determining whether to receive signals from a relay including a computer-readable medium having code for causing at least one computer to obtain one or more communication parameters related to a base station and code for causing the at least one computer to obtain one or more different communication parameters related to a relay assisting the base station. The computer-readable medium further includes code for causing the at least one computer to determine to receive signals from the base station with or without assistance from the relay based at least in part on comparing the one or more communication parameters with the one or more different communication parameters.

Moreover, in an aspect, an apparatus for determining whether to receive signals from a relay is provided that includes a link rate projecting component for determining one or more communication parameters related to a base station and one or more different communication parameters related to a relay assisting the base station. The apparatus further includes a serving cell determining component for selecting to receive signals from the base station with or without assistance from the relay based at least in part on comparing the one or more communication parameters with the one or more different communication parameters.

According to another example, a method for utilizing another base station for communicating with a device is provided. The method can include receiving a channel quality indicator (CQI) from a device related to a set of channel resources and a different CQI from the device related to a different set of channel resources and determining that the CQI is above a threshold level and the different CQI is below a different threshold level. The method further includes utilizing an additional base station for communicating with the device based at least in part on the determining that the CQI is above the threshold level and the different CQI is below the different threshold level.

In another aspect, an apparatus for utilizing another base station for communicating with a device is provided that includes at least one processor configured to receive a CQI from a device related to a set of channel resources and a different CQI from the device related to a different set of channel resources. The at least one processor is further configured to determine that the CQI is above a threshold level and the different CQI is below a different threshold level and utilize an additional base station for communicating with the device based at least in part on the at least one processor determining that the CQI is above the threshold level and the different CQI is below the different threshold level. In addition, the apparatus includes a memory coupled to the at least one processor.

In yet another aspect, an apparatus for utilizing another base station for communicating with a device is provided that includes means for receiving a CQI from a device related to a set of channel resources and a different CQI from the device related to a different set of channel resources. The apparatus further includes means for utilizing an additional base station for communicating with the device based at least in part on determining that the CQI is above a threshold level and the different CQI is below a different threshold level.

Still, in another aspect, a computer-program product is provided for utilizing another base station for communicating with a device including a computer-readable medium having code for causing at least one computer to receive a CQI from a device related to a set of channel resources and a different CQI from the device related to a different set of channel resources. The computer-readable medium further includes code for causing the at least one computer to determine that the CQI is above a threshold level and the different CQI is below a different threshold level and code for causing the at least one computer to utilize an additional base station for communicating with the device based at least in part on the code for causing the at least one computer to determine determining that the CQI is above the threshold level and the different CQI is below the different threshold level.

Moreover, in an aspect, an apparatus for utilizing another base station for communicating with a device is provided that includes a CQI receiving component for obtaining a CQI from a device related to a set of channel resources and a different CQI from the device related to a different set of channel resources. The apparatus further includes a base station employing component for utilizing an additional base station for communicating with the device based at least in part on determining that the CQI is above a threshold level and the different CQI is below a different threshold level.

In another example, a method for assisting a base station in serving a device is provided, which includes receiving control data or user-plane data and an indication of resources over which to transmit the control data or user-plane data from a base station and transmitting the control data or user-plane data along with the base station over the resources.

In another aspect, an apparatus for assisting a base station in serving a device is provided that includes at least one processor configured to receive control data or user-plane data and an indication of resources over which to transmit the control data or user-plane data from a base station and transmit the control data or user-plane data along with the base station over the resources. In addition, the apparatus includes a memory coupled to the at least one processor.

In yet another aspect, an apparatus for assisting a base station in serving a device is provided that includes means for receiving control data or user-plane data and an indication of resources over which to transmit the control data or user-plane data from a base station. The apparatus further includes means for transmitting the control data or user-plane data along with the base station over the resources.

Still, in another aspect, a computer-program product is provided for assisting a base station in serving a device including a computer-readable medium having code for causing at least one computer to receive control data or user-plane data and an indication of resources over which to transmit the control data or user-plane data from a base station. The computer-readable medium further includes code for causing the at least one computer to transmit the control data or user-plane data along with the base station over the resources.

Moreover, in an aspect, an apparatus for assisting a base station in serving a device is provided that includes a control/data receiving component for obtaining control data or user-plane data and an indication of resources over which to transmit the control data or user-plane data from a base station. The apparatus further includes a data communicating component for transmitting the control data or user-plane data along with the base station over the resources.

According to yet another example, a method for jointly serving a relay is provided including selecting a set of resources for transmitting control data and user-plane data to a relay. The method further includes indicating the set of resources to an additional base station to ensure orthogonality in using the relay for transmitting the control data and user-plane data and transmitting the control data and user-plane data to the relay over the set of resources.

In another aspect, an apparatus for jointly serving a relay is provided that includes at least one processor configured to select a set of resources for transmitting control data or user-plane data to a relay and communicate the set of resources to an additional base station to ensure orthogonality in using the relay for transmitting the control data or user-plane data. The at least one processor is further configured to transmit the control data or user-plane data to the relay over the set of resources. In addition, the apparatus includes a memory coupled to the at least one processor.

In yet another aspect, an apparatus for jointly serving a relay is provided that includes means for indicating a set of resources to an additional base station to ensure orthogonality in using a relay for transmitting control data or user-plane data. The apparatus further includes means for transmitting the control data or user-plane data to the relay over the set of resources.

Still, in another aspect, a computer-program product is provided for jointly serving a relay including a computer-readable medium having code for causing at least one computer to select a set of resources for transmitting control data or user-plane data to a relay and code for causing the at least one computer to communicate the set of resources to an additional base station to ensure orthogonality in using the relay for transmitting the control data or user-plane data. The computer-readable medium further includes code for causing the at least one computer to transmit the control data or user-plane data to the relay over the set of resources.

Moreover, in an aspect, an apparatus for jointly serving a relay is provided that includes a relay resource coordinating component for indicating a set of resources to an additional base station to ensure orthogonality in using a relay for transmitting control data or user-plane data and a data communicating component for transmitting the control data or user-plane data to the relay over the set of resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
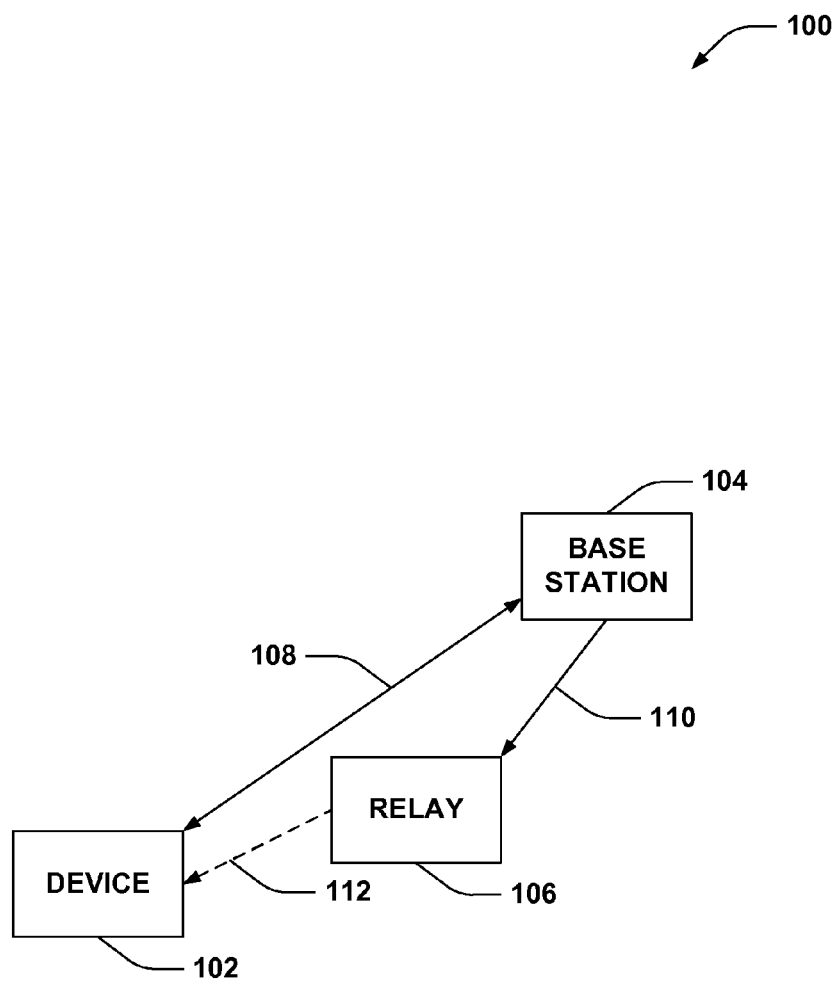
FIG. 1 illustrates an example system for utilizing a relay.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, due at least in part to relay deployment, a device can experience different channel conditions for control and data channels. Thus, it can be determined whether to serve the device from a serving cell and/or with or without assistance from a relay based at least in part on the channel conditions. For example, a configuration of serving cells and/or relays with the greatest received power can be selected for serving the device; in another example, a data rate can be projected for determining a configuration for serving the device.

Moreover, for example, a device can experience channel conditions over a threshold level for a user-plane data channel while experiencing channel conditions below a threshold level for a control channel due to the relay deployment. For example, the device can receive user-plane data from the relay and the serving base station; where the device is near the relay but further away from the serving base station, the foregoing case may arise. In addition, for example, the device near the relay can experience control channel quality above a threshold level from a different base station over the serving base station (e.g., where the different base station is closer to the device than the serving base station). Thus, for example, the serving base station can employ another base station (e.g., a base station closer to the device than the serving base station) to communicate with the device in such a way that the device can experience improved control channel conditions while benefiting from relay user-plane data transmissions. Thus, in one example, the device can communicate control data with the other base station while communicating user-plane data with the relay and/or at least one of the base stations.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

In FIG. 1, an example wireless communication system 100 facilitates determining whether to utilize relay assistance in receiving communications from a base station. System 100 can include a device 102 that is served by a base station 104 (e.g., a serving base station) to receive access to a wireless network or other services. System 100 also includes a relay 106 that can transmit signals received from base station 104 to augment coverage of the base station 104, improve data rates of the base station 104, and/or the like. Device 102 can be a UE, modem (or other tethered device), a portion thereof, and/or substantially any device that can communicate with a base station to receive access to a wireless network or other services. Base station 104 can be a macrocell, femtocell, picocell, or similar base station, eNB, a mobile base station, a device communicating in ad-hoc or peer-to-peer mode, a portion thereof, and/or the like, or substantially any device that can provide services to another device over a wireless connection. Relay 106 can be substantially any type of relay, including a type II relay in LTE. For example, a type II relay in LTE functions without assigning independent control data resources to devices; rather, the type II relay can receive and forward signals from the base station. Thus, a device 102 receiving signals from the type II relay 106 experiences boosted reception of user-plane data, but receives control data only from the base station 104.

According to an example, device 102 can communicate with base station 104 over link 108, which can be a downlink and/or uplink with base station 104. Relay 106 can also receive downlink transmissions from base station 104 over downlink 110 and can forward the downlink transmissions over downlink 112. In an example, device 102 can determine whether to receive downlink transmissions from relay 106 in addition to base station 104, and/or whether to select base station 104 as the serving base station. In one example, device 102 can determine such based at least in part on determining downlink received powers of the base station 104 and relay 106, projecting a rate of being served by base station 104 and/or relay 106, etc. For example, device 102 can determine a downlink received power (e.g., received signal strength indicator (RSSI), etc.) of signals from base station 104 and signals from relay 106. Where the downlink received power of signals from the relay 106 are greater than those received from base station 104, the device 102 can determine to receive downlink signals from the relay 106 in addition to signals from base station 104 for communicating in the wireless network. Otherwise, device 102 can determine to receive downlink signals only from base station 104.

In another example, device 102 projects a direct link rate of link 108, a relay link rate of link 108 assisted by link 112, and/or a backhaul link rate of link 110 to determine whether to utilize assistance from relay 106. As used herein, the terms "project," "projects" or "projecting" can relate to one or more of to measure, to predict or to estimate. In this example, device 102 can project the direct link rate based at least in part on a received or determined geometry of base station 104 (e.g., based on received signals strengths, etc.). As used herein, the term "geometry" of a base station can relate to a signal quality of a signal received from the base station. In addition, device 102 can project the relay link rate as a function of the direct link rate, backhaul link rate, and access link rate of link 112. Furthermore, device 102 can adjust one or more of the link rates, such as the relay link rate, by applying an efficiency factor. Where device 102 determines the direct link rate of link 108 as a higher projected rate, device 102 can be served by base station 104. Where device 102 determines the relay link rate of the direct link 108 assisted by link 112 as the higher projected rate, device 102 can be served by base station 104 with relay 106 assistance. In addition, for example, it is to be appreciated that in the latter case, device 102 can determine that base station 104 has at least a minimum threshold geometry (e.g., without relay assistance) to ensure reliable control data communications.

Figure 2:
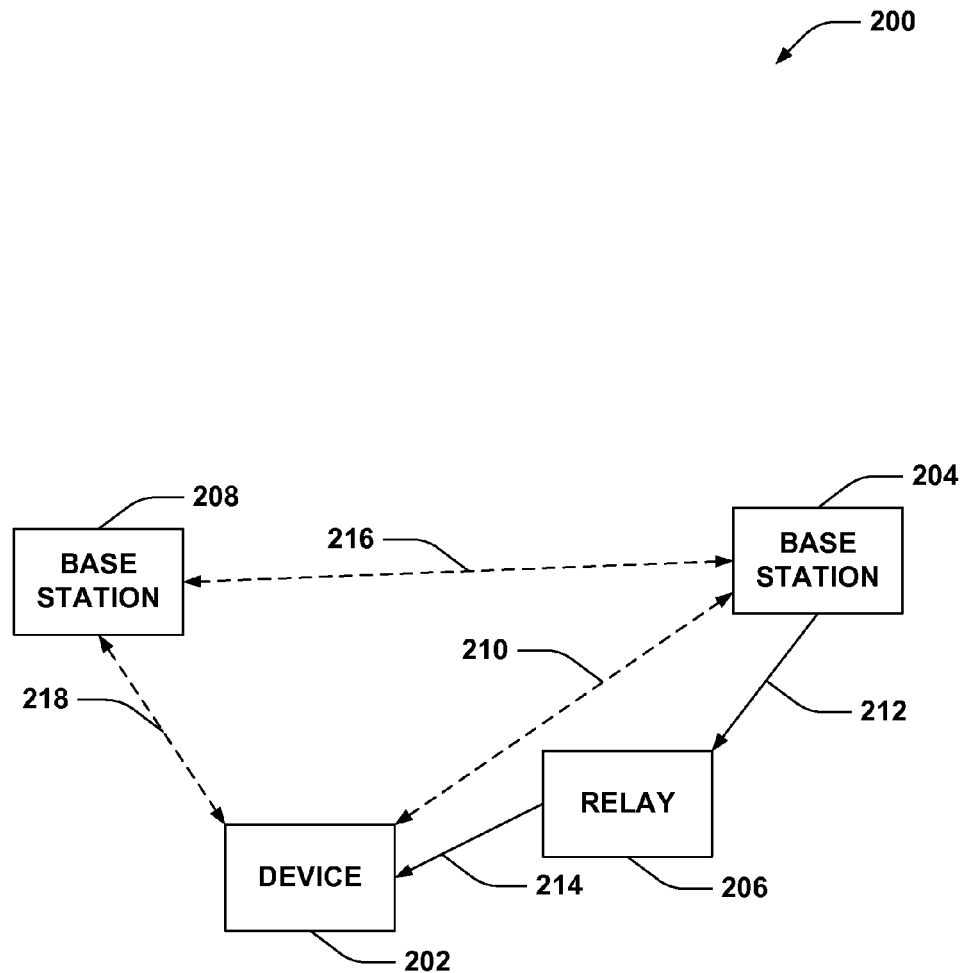
FIG. 2 illustrates an example system for employing an additional base station to communicate with a device.

Referring to FIG. 2, illustrated is an example wireless communication system 200 that facilitates utilizing one or more base stations to communicate with a device using an associated relay. System 200 can include a device 202 that is served by a base station 204 (e.g., a serving base station) to receive access to a wireless network or other services. System 200 also includes a relay 206 that can transmit signals received from base station 204 to provide relaying of the signals to device 202 or other devices. System 200 also includes another base station 208 that is within range of device 202 such that device 202 can receive signals from the base station 208. Device 202 can be a UE, modem etc., base stations 204 and 208 can each be a macrocell, femtocell, picocell, or similar base station, a mobile base station, eNB, etc., and relay 206 can be a type II relay in LTE, or a similar relay, etc., as described.

According to an example, device 202 can communicate with base station 204 over link 210, which can relate to downlink and/or uplink communications therewith. In addition, base station 204 can transmit signals over downlink 212, which can be received by relay 206 and forwarded over downlink 214, which can be received by device 202. Thus, in one example, device 202 can receive downlink signals related to base station 204 over link 210 and/or downlink 214 (e.g., combined signals over both links 210 and 214). This can improve throughput of the communications, as described, by using relay 206. Also, device 202 can communicate control data with base station 204 over link 210, but not necessarily with relay 206. The link 210 to base station 204 can have a signal quality below a threshold level, for example. The threshold level can relate to a minimum signal quality for reliable decoding thereof. Thus, for example, control data communications received over link 210 can be below the threshold level for proper decoding at device 202, while signal quality for user-plane data received over links 210 and 214 can be above a threshold level for decoding. Without reliable control data, for example, device 202 may not be able to decode user-plane data received over link 210 and downlink 214, which can mitigate advantages of relay 206. In addition, device 202 can receive signals from base station 208, which can additionally interfere with signals received over downlink 210.

In one example, channel conditions for user-plane data communications with base station 204 can be better than channel conditions for user-plane data communication at base station 208 due to the presence of the relay 206, while channel conditions for reporting control data can be better at base station 208 since the relay 206 does not facilitate communicating control data from device 202. In this example, base station 208 can be employed to assist in communicating with device 202. In one example, device 202 can be served jointly by base stations 204 and 208 using single frequency network (SFN), multiple-input multiple-output (MIMO), etc. In this configuration, for example, base stations 204 and 208 can communicate over an optional backhaul link 216 to provide effectuate SFN, MIMO, etc., such to provide device 202 with control data over common control data resources, and user-plane data over common user-plane resources (e.g., over links 210 and 218). In this example, relay 206 can still be operative, receiving user-plane data over downlink 212 and forwarding the user-plane data over downlink 214. In addition, base stations 204 and 208 provide device 202 with common uplink control data resources for receiving control data regarding the user-plane data resources, which can improve signal quality for the control data resources to above a threshold level.

In another example, base station 204 can employ base station 208 to serve device 202. In this example, base station 208 can actually serve the device 202 over link 218, such that the base station 208 and device 202 communicate control data and user-plane data over link 218. In one example, base station 208 can schedule device 202 over resources to benefit from relay 206; this can include coordinating resources among base stations 204 and 208 over backhaul link 216. For example, base station 204 can specify resources to base station 208 for assigning to the device 202. In an additional or alternative example, base station 208 can indicate to base station 204 resources over which base station 208 communicates user-plane data to device 202. In either case, base station 208 can indicate user-plane data to base station 204 to be transmitted to device 202, and base station 204 can so communicate the user-plane data over received or specified resources coordinated with base station 208, which can cause relay 206 to receive the user-plane data over downlink 212 and additionally forward the user-plane data over downlink 214.

In either example, base station 208 is utilized to facilitate communicating control data with device 202, while still allowing relay 206 to augment user-plane data communication to device 202. In either example, base station 204 can determine to employ base station 208 to communicate with device 202 using SFN, MIMO, etc., or to serve device 202 based at least in part on at least one of receiving channel quality indicator (CQI) over link 210 regarding control data sent over link 210, not receiving control data for control data over link 210 or user-plane data due to signal quality below a threshold level, receiving unreliable control data signals over link 210, and/or the like.

Figure 3:
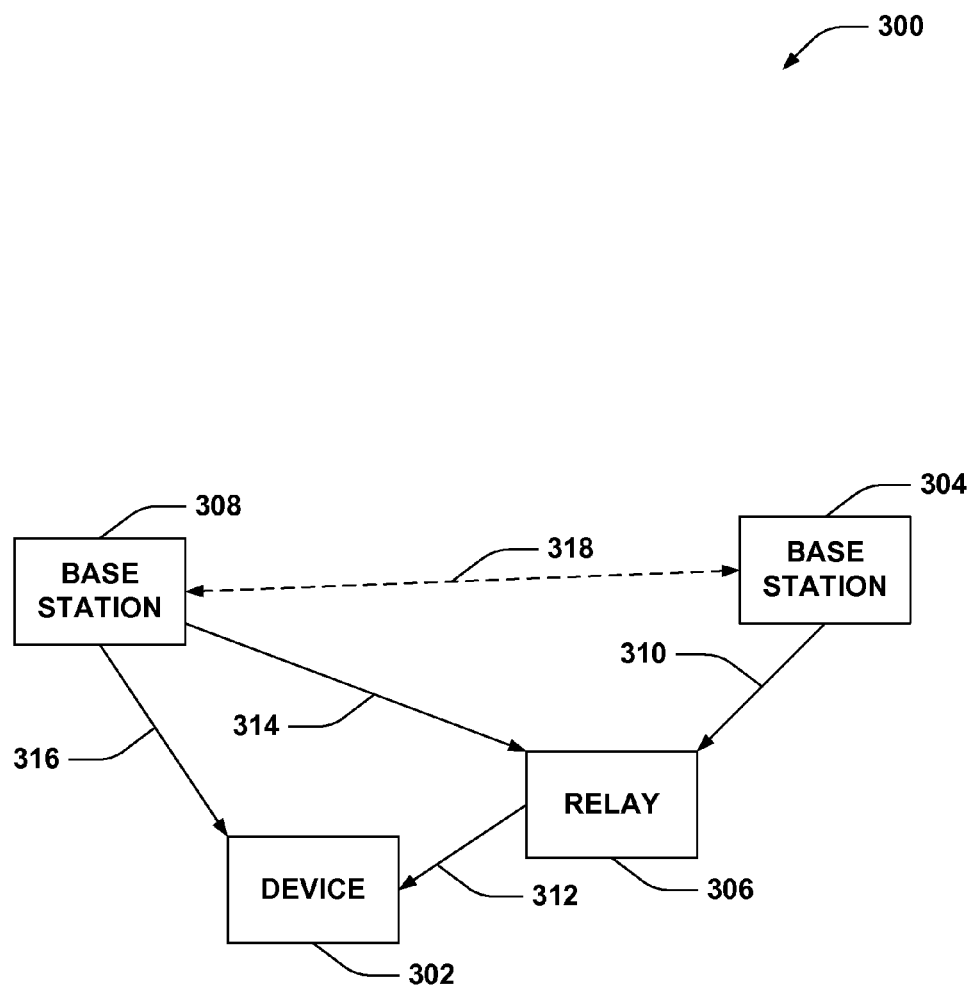
FIG. 3 illustrates an example system for jointly serving a relay.

Turning to FIG. 3, an example wireless communication system 300 is illustrated that facilitates multiple base stations utilizing a relay to augment communications to a device. System 300 can include a device 302 that is served by a base station 304 (e.g., a serving base station) to receive access to a wireless network or other services. System 300 also includes a relay 306 that can transmit signals received from base station 304 to provide relaying of the signals to device 302 or other devices, as described. System 300 also includes another base station 308 that is within range of device 302 such that device 302 can receive signals from the base station 308. Device 302 can be a UE, modem (or other tethered device), etc., base stations 304 and 308 can each be a macrocell, femtocell, picocell, or similar base station, eNB, a mobile base station, a device communicating in ad-hoc or peer-to-peer mode, etc., and relay 306 can be a type II relay in LTE, etc., as described.

In this example, similarly to FIGS. 1-2, relay 306 can be served by base station 304 such that relay 306 can receive signals from base station 304 over downlink 310 (which can correspond to resources shared by one or more devices), and can transmit the received signals over downlink 312 to boost reception at one or more devices, such as device 302. In addition, relay 306 can receive signals from base station 308 over downlink 314, where the downlink 314 exhibits channel conditions over a threshold level at relay 306, and can forward the signals over downlink 312 for reception by the one or more devices. To facilitate relaying signals from both base stations 304 and 308, relay 306 can monitor control channels of base stations 304 and 308 (e.g., simultaneously, on a time division multiplexing (TDM) basis, and/or the like) for communicating user-plane data therefrom over downlink 312. In one example, base stations 304 and 308 can negotiate resources for using relay 306 over backhaul link 318.

In this regard, where relay 306 can be served by two or more base station, relay 306 can do such to provide device 302 with improved user-plane data communications, as described in FIG. 1. For example, device 302 can experience channel conditions below a threshold for control data communications with base station 304 while experiencing channel conditions above a threshold for user-plane communications from base station 304 via relay 306. In one example, device 302 can determine base station 308 has better channel conditions for both control and user-plane data based at least in part on receiving user-plane data communications therefrom over link 312 from relay 306, and thus device 302 can initiate communications with and/or be handed over to base station 308. In another example, as described above, base station 304 can employ base station 308 to serve device 302 by requesting that base station 308 do so over backhaul link 318, specifying resources over which base station 308 should communicate with device 302, indicating that base station 308 should select resources for communicating with device 302 that allows utilization of relay 306, and/or the like. In any case, relay 306 can receive signals from both base stations 304 and 308 in different time periods, and can transmit the signals over downlink 312. In yet another example, base station 304 and/or 308 can indicate resources over which to receive control data from either base station to relay 306, and relay 306 can switch among the resources according to the indication.

Figure 4:
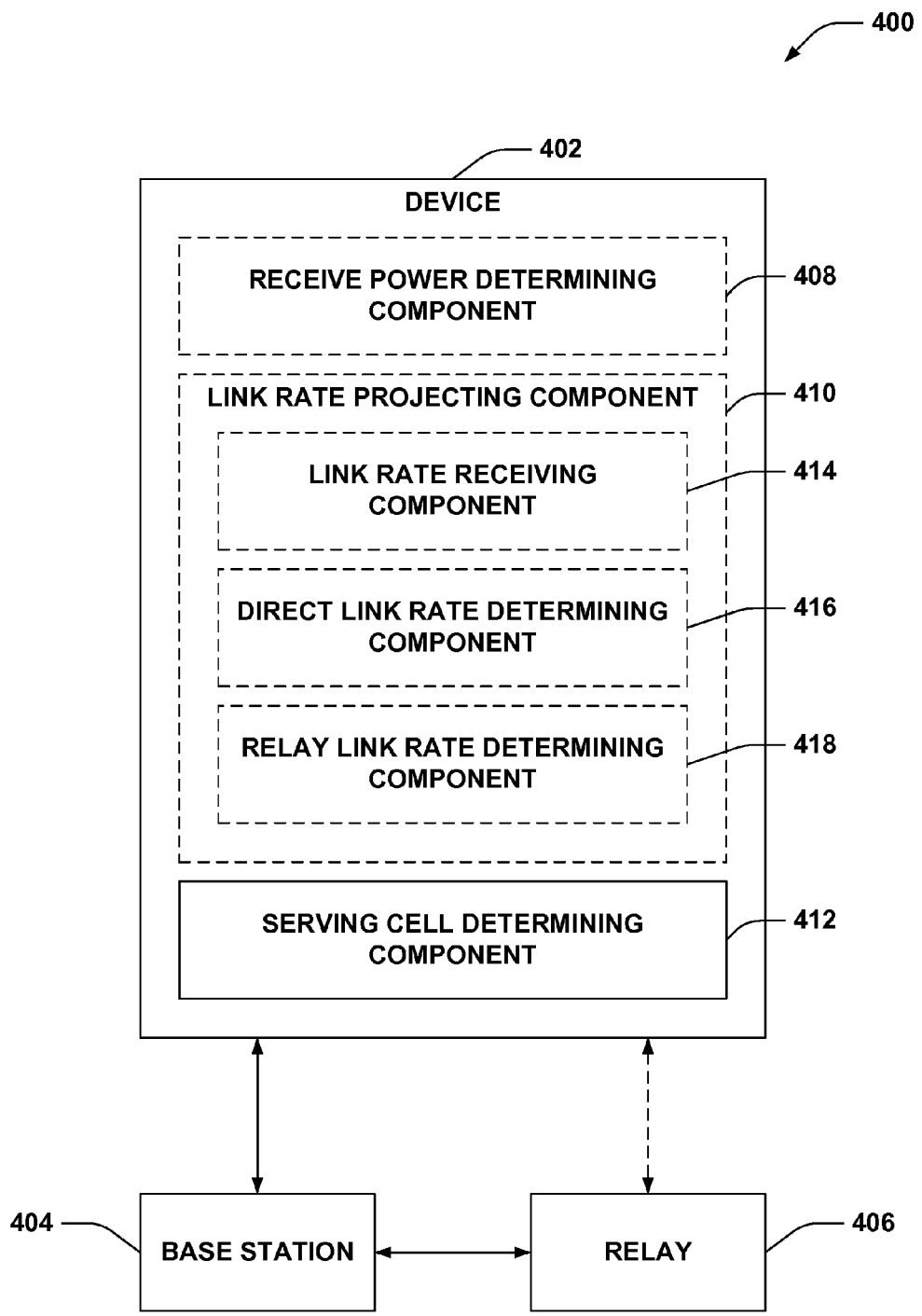
FIG. 4 illustrates an example system that facilitates selecting whether to receive relay assistance.

Referring to FIG. 4, illustrated is an example wireless communication system 400 that facilitates selecting a serving cell. System 400 can include a device 402 that communicates with a base station 404 to receive access to a wireless network or other communication services. Device 402 can also optionally communicate with a relay 406, as described, to receive improved data access from base station 404. Device 402 can be a UE, modem, etc., base station 404 can be a macrocell, femtocell, picocell, or similar base station, an eNB, etc., and relay 406 can be a type II relay in LTE or a similar relay, as described.

Device 402 can comprise an optional receive power determining component 408 that measures power of signals received from a base station and a relay, an optional link rate projecting component 410 for estimating a data rate of one or more links, and a serving cell determining component 412 that determines a serving cell and/or relay from which to receive signals based at least in part on determined receive powers and/or projected link rates. In addition, link rate projecting component 410 can optionally comprise a link rate receiving component 414 that receives or otherwise determines link rates corresponding to one or more links, a direct link rate determining component 416 that discerns a link rate of a direct link with a base station, and a relay link rate determining component 418 that discerns a link rate of a link with the base station assisted by another link with a relay.

According to an example, receive power determining component 408 can measure received signal power (e.g., RSSI) of base station 404 and of relay 406. In one example, device 402 can have selected base station 404 as a serving base station based at least in part on determining base station 404 as having a highest signal quality at device 402. Where base station 404 has a received signal power that is improved over relay 406 (e.g., by at least a threshold level, in one example), serving cell determining component 412 can determine to select base station 404 for receiving downlink communications without assistance from relay 406. Where relay 406 has a received signal power improved over base station 404 (e.g., by at least a threshold level), serving cell determining component 412 can select base station 404 for receiving downlink communications with assistance from relay 406.

In another example, link rate projecting component 410 can compute a link rate for a direct link to base station 404 and a relay link to base station 404 assisted by relay 406 to determine a serving cell configuration. In this example, direct link rate determining component 416 and/or relay link rate determining component 418 can project one or more link rates. For example, direct link rate determining component 416 can compute a link rate of a direct link to base station 404 based at least in part on determining a geometry of the base station 404 (e.g., based at least in part on signal quality and/or the like). In addition, for example, relay link rate determining component 418 can compute a relay link rate based at least in part on at least one of determining an access link rate of a direct link between device 402 and relay 406, determining a composite rate link of a direct link between device 402 and base station 404 as assisted by the access link between device 402 and relay 406, receiving a backhaul link rate for a link between base station 404 and relay 406, and/or the like. For example, link rate receiving component 414 can receive the backhaul link rate from base station 404, relay 406, and/or the like.

In a specific example, relay link rate determining component 418 can project the relay link rate based at least in part on the following function: MIN(0.5*backhaul link rate, 0.5* (direct link rate+composite link rate)), where link rate receiving component 414 obtains the backhaul link rate, relay link rate determining component 418 computes the direct link rate as the rate of the first HARQ transmission from the base station 404 without relay 406 assistance, and relay link rate determining component 418 computes the composite link rate as the combination of the direct link rate and the access link rate (which can represent a second HARQ transmission from base station 404 with relay 406 assistance), as described above. For example, the rate can relate to timing between device 402 sending communications to base station 404, and receiving the first HARQ transmission, timing between receiving the first and second HARQ transmissions, and/or the like.

In addition, for example, relay link rate determining component 418 can adjust the projected relay link rate by an efficiency factor that accounts for the reduction of spectral efficiency based on using relay 406. In any case, serving cell determining component 412 can determine to receive downlink signals from the base station 404 and to be assisted by the relay 406 or not based at least in part on whether the projected direct link rate is greater than the projected relay link rate, as described. In addition, where serving cell determining component 412 determines the projected relay link rate is greater than the projected direct link rate, serving cell determining component 412 can determine that the projected direct link rate is at least at a threshold level to ensure reliable control data communications with base station 404. Where the projected direct link rate is not at the threshold level, serving cell determining component 412 can evaluate other cells for serving device 402.

Figure 5:
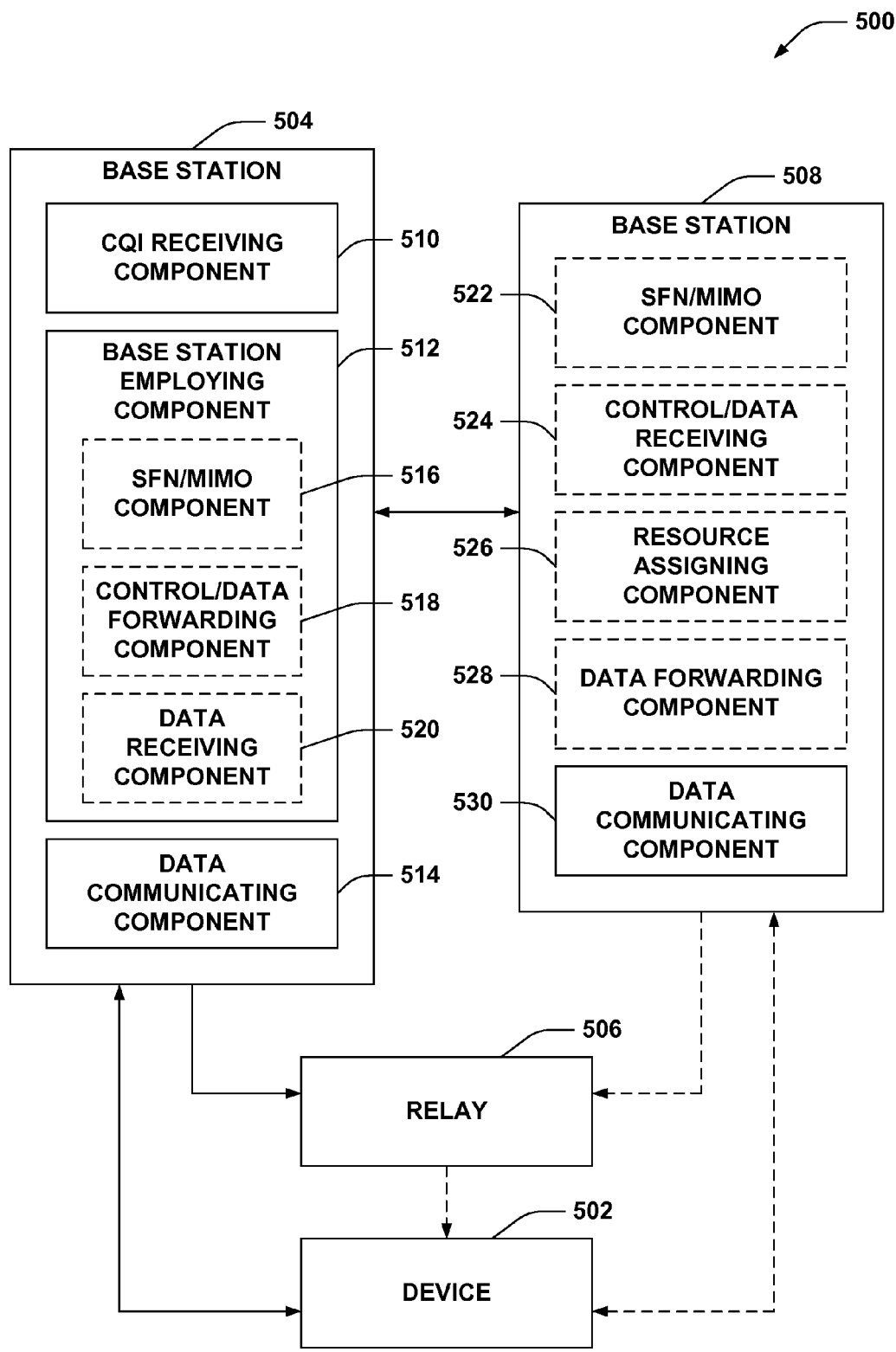
FIG. 5 illustrates an example system for utilizing an additional base station to communicate with a device.

Turning to FIG. 5, an example wireless communication system 500 for employing another base station to serve a device is illustrated. System 500 comprises a device 502 that is served by a base station 504 (e.g., a serving base station) to receive access to a wireless network or other services. System 500 also includes a relay 506 that can transmit signals received from base station 504 to provide relaying of the signals to device 502 or other devices, as described. System 500 also includes another base station 508 that is within range of device 502 such that device 502 can receive signals from the base station 508. Device 502 can be a UE, modem (or other tethered device), etc., base stations 504 and 508 can each be a macrocell, femtocell, picocell, or similar base station, eNB, a mobile base station, a device communicating in ad-hoc or peer-to-peer mode, etc., and relay 506 can be a type II relay in LTE, etc., as described.

Base station 504 can comprise a CQI receiving component 510 for obtaining one or more CQI values from a device, a base station employing component 512 that leverages another base station for communicating with the device based at least in part on the CQI values, and a data communicating component 514 that can transmit user-plane data over a downlink. Base station employing component 512 can comprise an optional SFN/MIMO component 516 that can correspond with the other base station to coordinate resources for communicating in SFN/MIMO to the device, an optional control/data forwarding component 518 that can transmit control data and user-plane data to the other base station for providing to the device and/or to specify a set of resources over which to communicate with the device, and an optional data receiving component 520 that obtains data from the other base station for communicating to the device.

Base station 508 can comprise an optional SFN/MIMO component 522 that coordinates resources with another base station for communicating in SFN/MIMO to a device, an optional control/data receiving component 524 that obtains control data and/or user-plane data from the other base station for communicating to the device, and an optional resource assigning component 526 that allocates resources to a device at the request of the other base station. Base station 508 can also comprise an optional data forwarding component 528 that provides data to the other base station for additionally communicating to the device, and a data communicating component 530 that transmits control and/or user-plane data to the device. It is to be appreciated that base station 504 can comprise components of base station 508 and/or vice versa to provide similar functionality.

According to an example, as described, device 502 can select base station 504 as a serving base station based at least in part on a quality of signals received therefrom. In one example, relay 506 can assist base station 504 in relaying signals from base station 504 to device 502. In one example, device 502 can select base station 504 as the serving base station based at least in part on a quality of downlink signals, which can also relate to signals forwarded by relay 506. Thus, in this example, control channel conditions of base station 504 can be impaired as compared to user-plane channel conditions, as described. In another example, device 502 can move further from base station 504 such that control channel conditions degrade as devices 502 moves away. In either case, device 502 can still experience user-plane data channel conditions above a threshold level based on the assistance from relay 506, as described. In addition, in one example, device 502 can be within range of base station 508 such that signals from base station 508 are of better quality than signals from base station 504 without relay assistance (e.g., control data signals).

In this example, device 502 can report CQI to base station 504 over a control channel. For example, base station 504 can provide control channel resources to device 502 for reporting CQI, such as a physical uplink control channel (PUCCH) in LTE, etc. CQI receiving component 510 can obtain the CQI from device 502, which can relate to channel conditions over a user-plane data channel provided by base station 504 (e.g., a physical downlink shared channel (PDSCH) in LTE), a control channel provided by base station (e.g., physical downlink control channel (PDCCH) in LTE), and/or the like. For example, base station employing component 512 can determine whether to utilize another base station for communicating with device 502 based at least in part on the reported CQIs.

In one example, base station employing component 512 can determine such where the CQI for the control channel is below a threshold level and the CQI for the user-plane data channel is above a threshold level. In this example, the device 502 experiences user-plane data channel conditions above a threshold level due to relay 506 assistance; however, device 502 may experience improved control channel conditions with another base station. Thus, base station employing component 512 can determine to utilize another base station at least to communicate control data with device 502, as described. In one example, base station employing component 512 can determine the other base station as base station 508 based at least in part on a measurement report received from device 502 (e.g., related to handover). In addition, for example, base stations 504 and 508 can communicate with one another over an X2 interface in LTE, or a similar interface.

In one example, SFN/MIMO component 516 can communicate with base station 508 over a backhaul connection to coordinate control data and user-plane data resources for communicating with device 502 over SFN/MIMO. In this example, SFN/MIMO component 522 can similarly communicate with base station 504 to coordinate the resources for SFN/MIMO communications with device 502. Based at least in part on the coordinated resources, data communicating component 514 and data communicating component 530 can transmit user-plane data and/or control data to device 502 and receive communications therefrom in SFN/MIMO. In addition, relay 506 can receive user-plane data communications from data communicating component 514 and can forward the user-plane data communications to boost user-data plane reception at device 502. In this regard, device 502 can experience control channel conditions above a threshold level since base station 508 is also communicating control data to device 502, as well as user-plane data channel conditions above a threshold level since base station 504, base station 508, and/or relay 506 can all transmit user-plane data to device 502.

In another example, base station employing component 512 can determine to request base station 508 serve device 502. In one example, control/data forwarding component 518 can, in this regard, provide control data and/or user-plane data related to device 502 to base station 508. Control/data receiving component 524 can obtain the control and/or user-plane data. In one example, control/data forwarding component 518 provides base station 508 with user-plane data or control data and an indication of resources over which to transmit the user-plane data or control data to device 502. In this example, control/data receiving component 524 can obtain the user-plane data or control data and indication of resources. Resource assigning component 526 can allocate the resources to device 502, and data communicating component 530 can transmit the user-plane data or control data to device 502 over the resources (e.g., and data communicating component 514 and/or relay 506 can transmit the same user-plane data or control data to device 502 over similar resources). In this example, control/data forwarding component 518 and control/data receiving component 524 can coordinate resource assignments and related data so relay 506 can assist base station 504 in transmitting user-plane data or control data to device 502, and device 502 can transmit related control data to base station 508. In addition, for example, it is to be appreciated that control/data receiving component 524 can determine the resources over which to transmit the user-plane data or control data based at least in part on decoding control data received for providing to the device 502 (e.g., where the control data relates to a resource assignment).

Moreover, for example, control/data forwarding component 518 can provide a suggested resource allocation to base station 508 for device 502. In this example, resource assigning component 526 can assign the suggested resources to device 502 or otherwise negotiate resources with base station 504 for assigning to device 502. Subsequently, data communicating component 530 can transmit user-plane data to device 502 over the control data resources. In addition, data forwarding component 528 can provide the user-plane data to base station 504, data receiving component 520 can obtain the data, and data communicating component 514 can transmit the data over similar resources. In addition, it is to be appreciated that data communicating component 530 can receive control data from device 502 regarding the resources. In this regard, for example, resource assigning component 526 can negotiate any changes in resources (e.g., based on the received control data) with base station 504.

Figure 6:
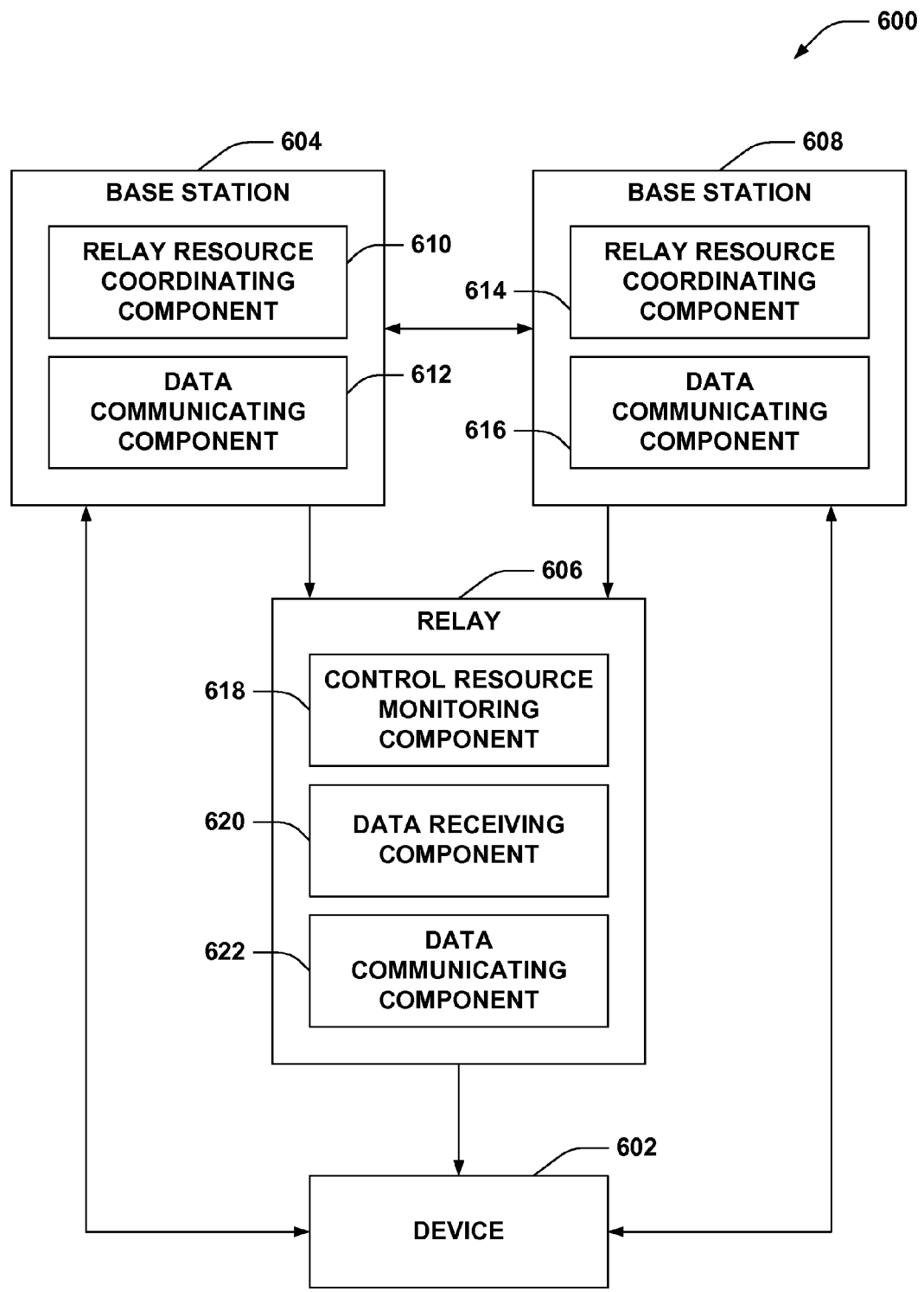
FIG. 6 illustrates an example system for coordinating resources to jointly utilize a relay.

Referring to FIG. 6, an example wireless communication system 600 is illustrated that facilitates utilizing a relay to forward signals from multiple base stations. System 600 comprises a device 602 that is served by a base station 604 (e.g., a serving base station) to receive access to a wireless network or other services. System 600 also includes a relay 606 that can transmit signals received from base station 604 and/or a base station 608 to provide relaying of the signals to device 602 or other devices, as described. System 600 also includes another base station 608 that is within range of device 602 such that device 602 can receive signals from the base station 608. Device 602 can be a UE, modem (or other tethered device), etc., base stations 604 and 608 can each be a macrocell, femtocell, picocell, or similar base station, eNB, a mobile base station, a device communicating in ad-hoc or peer-to-peer mode, etc., and relay 606 can be a type II relay in LTE, etc., as described.

Base stations 604 and 608 can comprise relay resource coordinating components 610 and 614 that can negotiate resources during which to transmit signals to a relay for forwarding in a wireless network. This can include relay resource coordinating component 610 transmitting an indication of resources to base station 608, and relay resource coordinating component 608 avoiding assigning the indicated resources for communicating with the relay 606. In either case, data communicating components 612 and 616 can transmit signals for reception by the relay or one or more other devices. Relay 606 can include a control resource monitoring component 618 that can allocate resources for monitoring control information from a plurality of base stations, a data receiving component 620 that obtains user-plane downlink data signals from the plurality of base stations based on the control information, and a data communicating component 622 that can forward obtained downlink user-plane data signals in a wireless network.

According to an example, data communicating components 612 and 616 can transmit downlink signals comprising user-plane data and/or control data. Control resource monitoring component 618 can receive control data signals from base stations 604 and 608 separately using TDM, and/or the like. Based at least in part on the received control data signals, data receiving component 620 can obtain user-plane data signals from base station 604 or base station 608 at a given point in time, and data communicating component 622 can forward the user-plane data signals. In addition, in this regard, relay resource coordinating components 610 and 614 can negotiate resources over which base station 604 and base station 608 can respectively transmit to utilize relay 606 assistance, as described, to ensure orthogonality among the resources. Thus, where device 602 receives a signal from base stations 604 and 608 have a signal quality over a threshold level due to relay 606 assistance, device 602 can select a serving base station based on control data conditions. In another example, data communicating component 612 and/or 616 can indicate resources over which base station 604 and/or 608 transmit control data to relay 606. Data receiving component 620 can obtain the indication, and control resource monitoring component 618 can accordingly switch between resources to receive control data from base stations 604 and 608 according to the indication.

Referring to FIGS. 7-10, example methodologies relating to utilizing a relay in wireless communications are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 7:
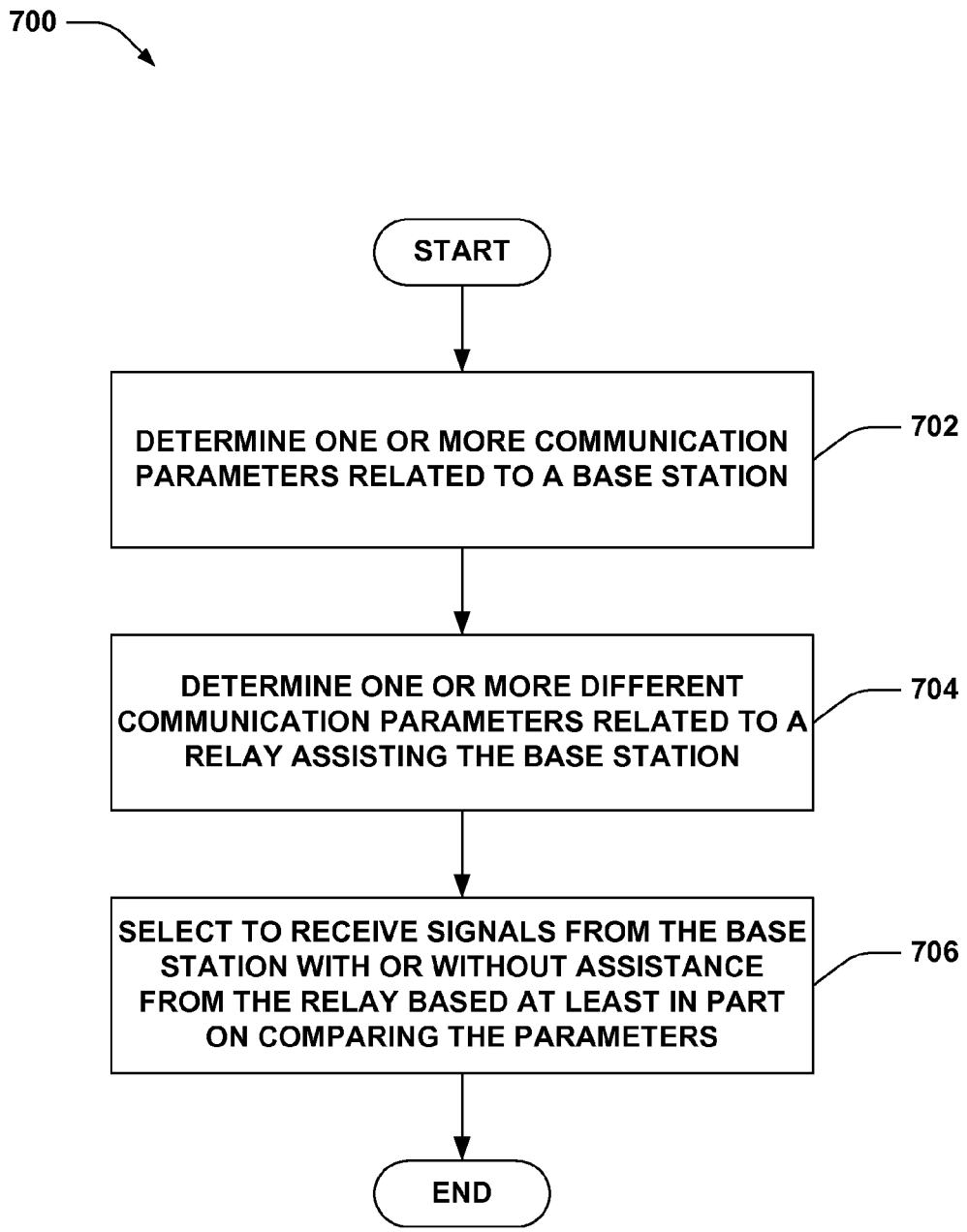
FIG. 7 illustrates an example methodology that selects whether to receive assistance from a relay.

Referring to FIG. 7, an example methodology 700 is displayed that facilitates determining whether to utilize relay assistance. At 702, one or more parameters related to a base station can be determined. For example, the one or more parameters can relate to a data link rate of the base station, geometry of the base station, and/or the like, and can be determined based at least in part on receiving the one or more parameters, projecting the one or more parameters from other received parameters, and/or the like, as described. At 704, one or more different communication parameters related to a relay assisting the base station can be determined. The one or more different communication parameters can be similar to the one or more communication parameters and/or can include a backhaul link rate at the relay, composite data link rate of the relay and base station, and/or the like, as described. Moreover, an efficiency factor can be applied to the one or more different communication parameters based on relay communications, as described. At 706, receiving signals from the base station with or without assistance from the relay can be selected based at least in part on comparing the parameters. Thus, as described, where a determined or projected link rate with the base station is at least within a threshold greater than that of the relay, the base station can be utilized without relay assistance, etc.

Figure 8:
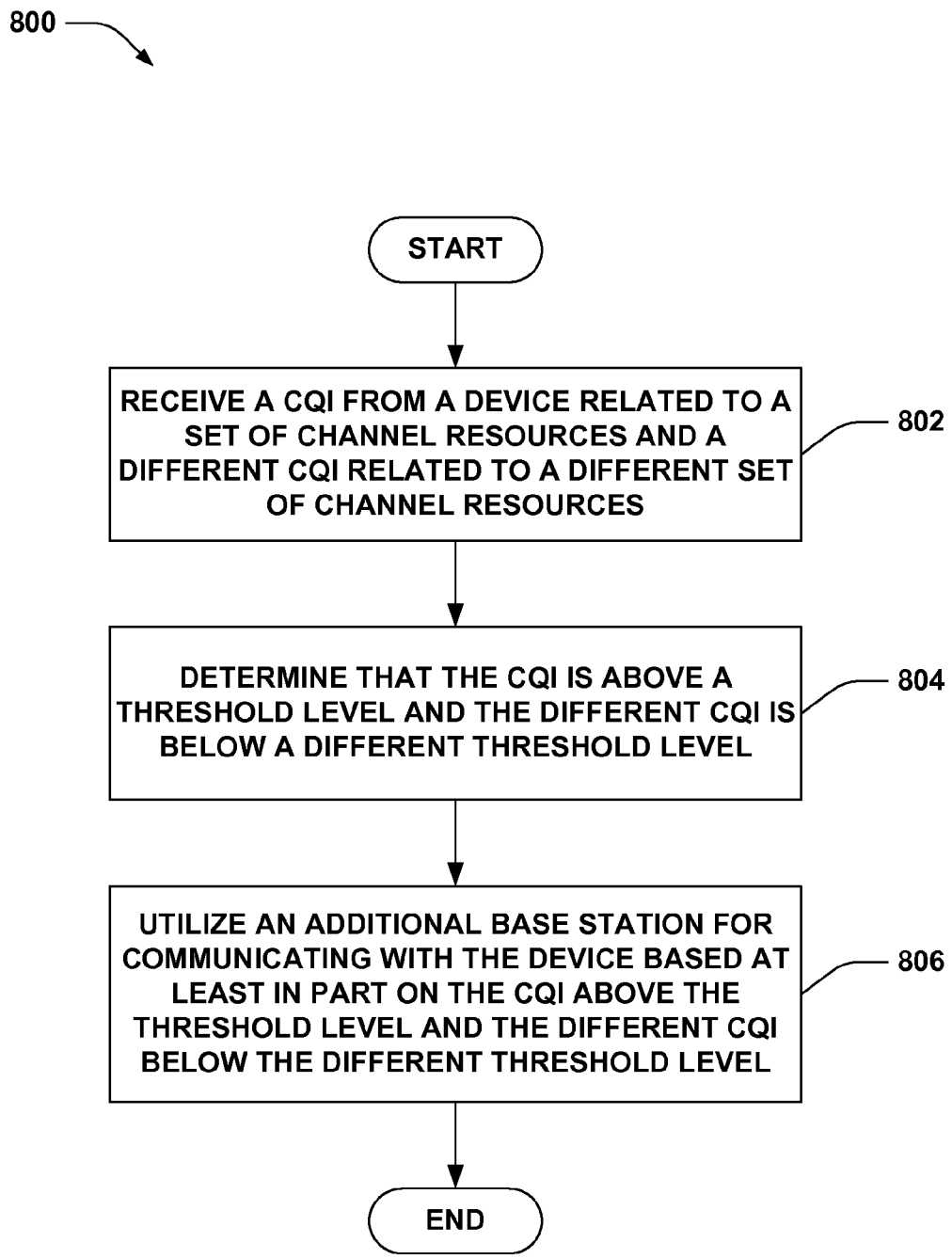
FIG. 8 illustrates an example methodology that employs an additional base station to serve a device.

Turning to FIG. 8, an example methodology 800 is displayed that facilitates determining whether to utilize an additional base station to serve a device. At 802, a CQI related to a set of channel resources and a different CQI related to a different set of channel resources can be received from a device. As described, the CQI can relate to a set of user-plane data channel resources and the different CQI can relate to a set of control channel resources. The CQI and the different CQI can differ based at least in part on additionally receiving signals over the user-plane data channel resources from a relay. Thus, at 804, it can be determined that the CQI is above a threshold level and the different CQI is below a different threshold level. At 806, an additional base station can be utilized for communicating with the device based at least in part on the CQI above the threshold level and the different CQI below the different threshold level. For example, utilizing the additional base station can include coordinating SFN and/or MIMO resources with the additional base station, employing the additional base station to serve the device (e.g., over specified resources), and/or the like, as described.

Figure 9:
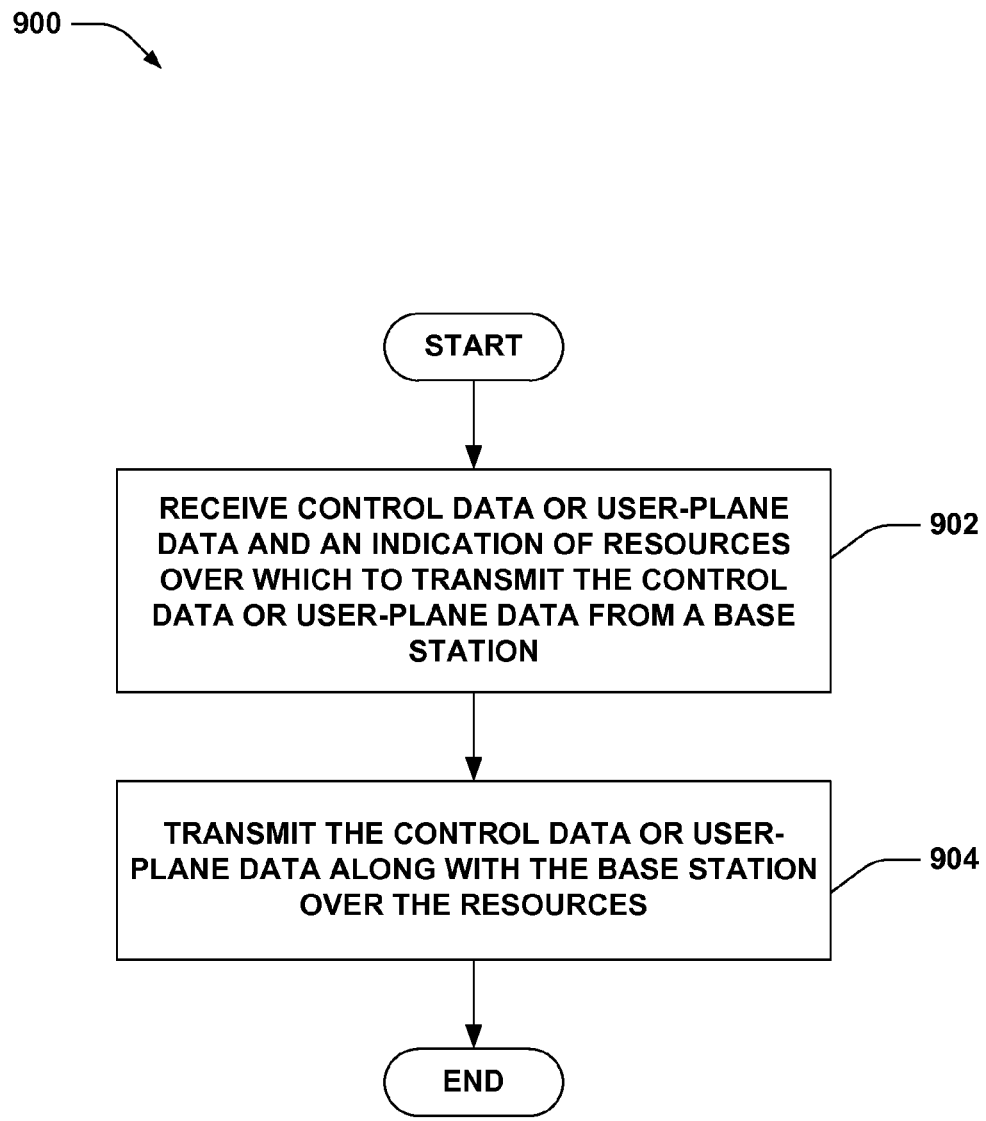
FIG. 9 illustrates an example methodology for assisting a base station in serving a device.

FIG. 9 depicts an example methodology 900 for assisting a base station in serving a device. At 902, control data or user-plane data and an indication of resources over which to transmit the control data or user-plane data can be received from a base station. The data and indication of resources can be received over an X2 interface, for example. In addition, in an example, the indication of resources can be determined based at least in part on decoding at least a portion of the control data or other control data intended for a corresponding device. At 904, the control data or user-plane data can be transmitted along with the base station over the resources.

Figure 10:
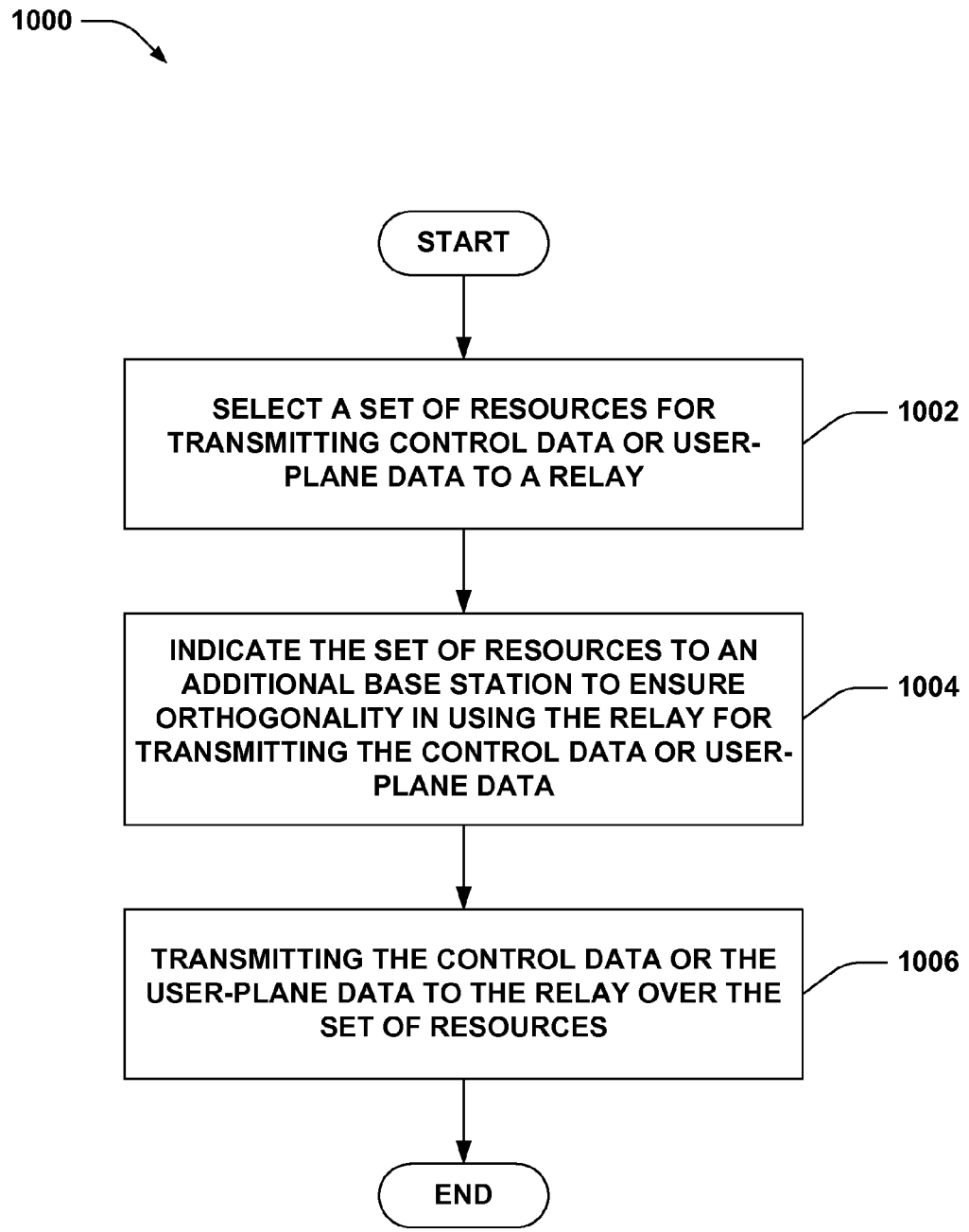
FIG. 10 illustrates an example methodology for jointly serving a relay.

Referring to FIG. 10, illustrated is an example methodology 1000 for coordinating resources for utilizing a relay. At 1002, a set of resources can be selected for transmitting control data or user-plane data to a relay. The set of resources can be selected, for example, based at least in part on a configuration, network specification, hardcoding, etc. At 1004, the set of resources can be indicated to an additional base station to ensure orthogonality in using the relay for transmitting the control data or the user-plane data. As described, for example, the set of resources can be negotiated with the additional base station using a series of messages. At 1006, the control data or the user-plane data can be transmitted to the relay over the set of resources. Thus, a relay can be shared with the additional base station.

It will be appreciated that, in accordance with one or more aspects described herein, inferences can be made regarding projecting link rates, determining whether or not to use relay assistance, determining whether to employ another base station for communicating with a device, negotiating resources for communicating with the device and/or with a relay, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
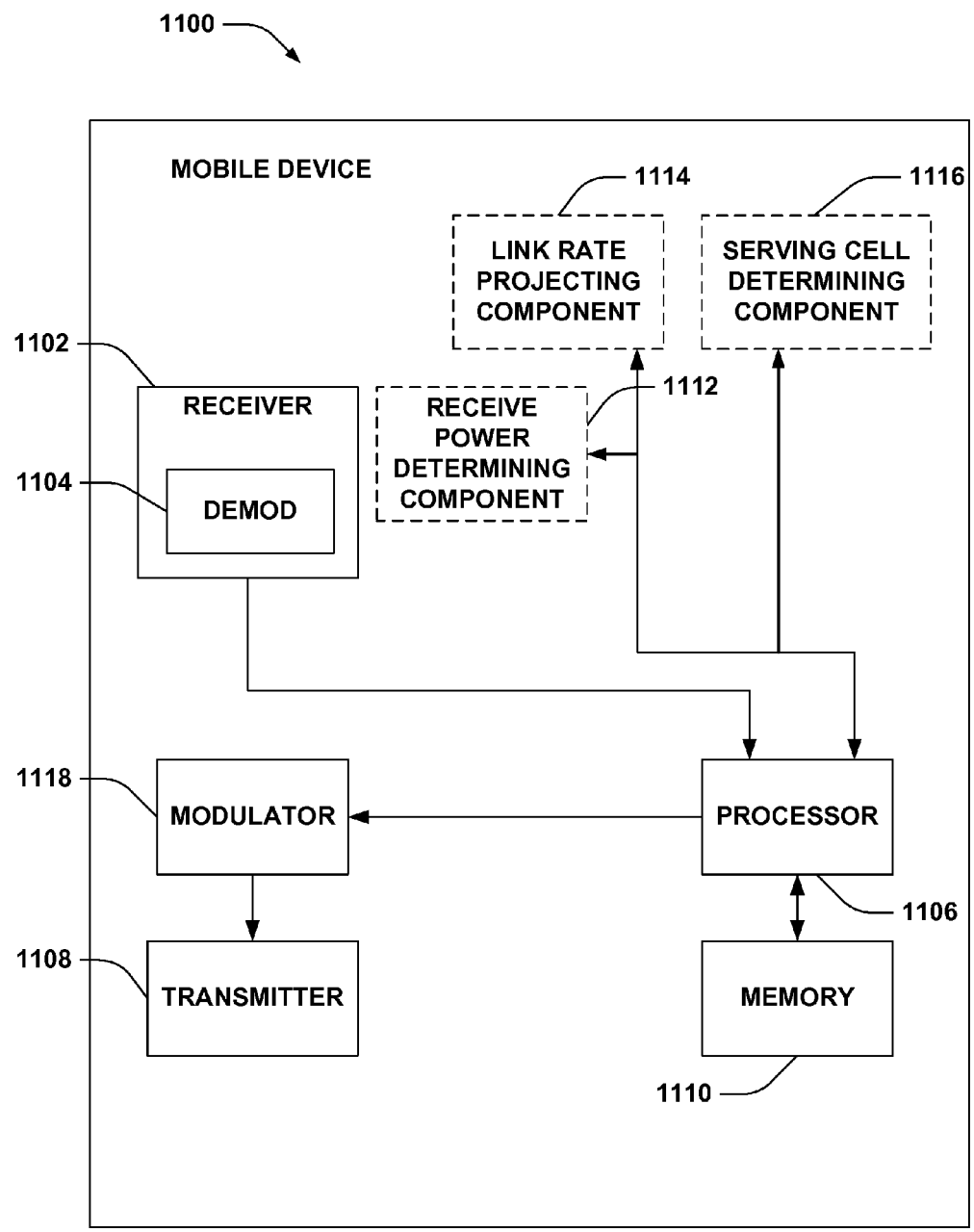
FIG. 11 illustrates an example mobile device for selecting whether to receive relay assistance.

FIG. 11 is an illustration of a mobile device 1100 that facilitates selecting whether to receive relay assistance. Mobile device 1100 comprises a receiver 1102 that receives a signal from, for instance, a receive antenna (not shown), performs typical actions on (e.g., filters, amplifies, downconverts, etc.) the received signal, and digitizes the conditioned signal to obtain samples. Receiver 1102 can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1108, a processor that controls one or more components of mobile device 1100, and/or a processor that both analyzes information received by receiver 1102, generates information for transmission by transmitter 1108, and controls one or more components of mobile device 1100.

Mobile device 1100 can additionally comprise memory 1110 that is operatively coupled to processor 1106 and that can store data to be transmitted, received data, information related to available channels, data associated with analyzed signal and/or interference strength, information related to an assigned channel, power, rate, or the like, and any other suitable information for estimating a channel and communicating via the channel. Memory 1110 can additionally store protocols and/or algorithms associated with estimating and/or utilizing a channel (e.g., performance based, capacity based, etc.).

It will be appreciated that the data store (e.g., memory 1110) described herein can be either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 1110 of the subject systems and methods is intended to comprise, without being limited to, these and any other suitable types of memory.

Processor 1106 can further be optionally operatively coupled to a receive power determining component 1112, which can be similar to receive power determining component 408, a link rate projecting component 1114, which can be similar to link rate projecting component 410, or a serving cell determining component 1116, which can be similar to serving cell determining component 412. Mobile device 1100 still further comprises a modulator 1118 that modulates signals for transmission by transmitter 1108 to, for instance, a base station, another mobile device, etc. Although depicted as being separate from the processor 1106, it is to be appreciated that the receive power determining component 1112, link rate projecting component 1114, serving cell determining component 1116, demodulator 1104, and/or modulator 1118 can be part of the processor 1106 or multiple processors (not shown), and/or stored as instructions in memory 1110 for execution by processor 1106.

Figure 12:
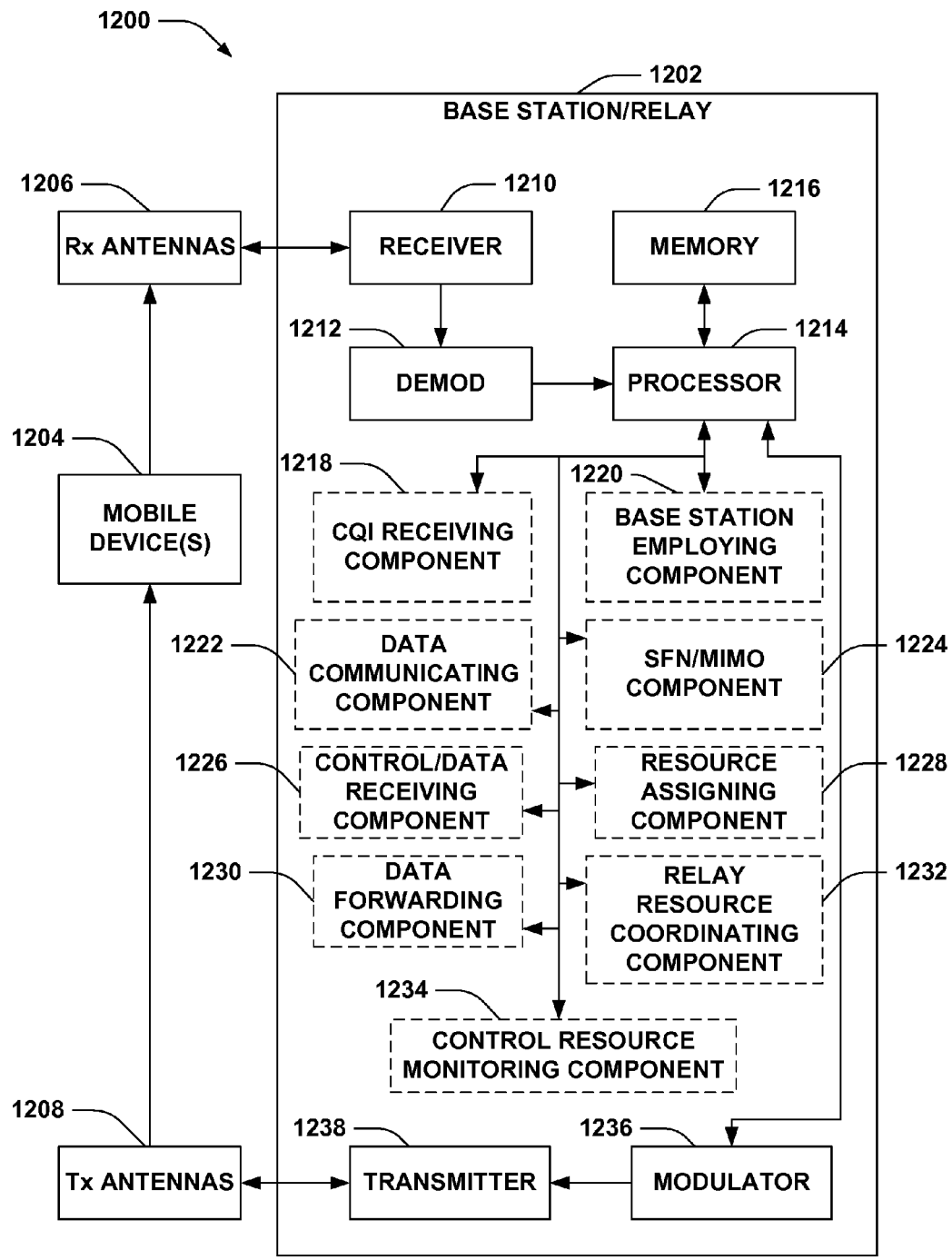
FIG. 12 illustrates an example system for utilizing a relay.

FIG. 12 is an illustration of a system 1200 that facilitates communicating with one or more devices using wireless communications. System 1200 comprises a base station/relay 1202, which can be substantially any base station (e.g., a small base station, such as a femtocell, picocell, etc., mobile base station . . . ), a relay, etc., having a receiver 1210 that receives signal(s) from one or more mobile devices 1204 through a plurality of receive antennas 1206 (e.g., which can be of multiple network technologies, as described), and a transmitter 1238 that transmits to the one or more mobile devices 1204 through a plurality of transmit antennas 1208 (e.g., which can be of multiple network technologies, as described). In addition, in one example, transmitter 1238 can transmit to the mobile devices 1204 over a wired front link. Receiver 1210 can receive information from one or more receive antennas 1206 and is operatively associated with a demodulator 1212 that demodulates received information. In addition, in an example, receiver 1210 can receive from a wired backhaul link. Demodulated symbols are analyzed by a processor 1214 that can be similar to the processor described above with regard to FIG. 11, and which is coupled to a memory 1216 that stores information related to estimating a signal (e.g., pilot) strength and/or interference strength, data to be transmitted to or received from mobile device(s) 1204 (or a disparate base station (not shown)), and/or any other suitable information related to performing the various actions and functions set forth herein.

Processor 1214 is further optionally coupled to a CQI receiving component 1218, which can be similar to CQI receiving component 510, a base station employing component 1220, which can be similar to base station employing component 512, or a data communicating component 1222, which can be similar to data communicating component 514, 530, 612, 616, and/or 622. In addition, processor 1214 can be optionally coupled to a SFN/MIMO component 1224, which can be similar to SFN/MIMO component 516 and/or 522, a control/data receiving component 1226, which can be similar to control/data receiving component 524 or data receiving component 520 or 620, a resource assigning component 1228, which can be similar to resource assigning component 526, or a data forwarding component 1230, which can be similar to control/data forwarding component 518 or data forwarding component 528. Processor 1214 can further be optionally coupled to a relay resource coordinating component 1232, which can be similar to relay resource coordinating component 610 or 614, or a control resource monitoring component 1234, which can be similar to control resource monitoring component 618.

Moreover, for example, processor 1214 can modulate signals to be transmitted using modulator 1236, and transmit modulated signals using transmitter 1238. Transmitter 1238 can transmit signals to mobile devices 1204 over Tx antennas 1208. Furthermore, although depicted as being separate from the processor 1214, it is to be appreciated that the CQI receiving component 1218, base station employing component 1220, data communicating component 1222, SFN/MIMO component 1224, control/data receiving component 1226, resource assigning component 1228, data forwarding component 1230, relay resource coordinating component 1232, control resource monitoring component 1234, demodulator 1212, and/or modulator 1236 can be part of the processor 1214 or multiple processors (not shown), and/or stored as instructions in memory 1216 for execution by processor 1214.

Figure 13:
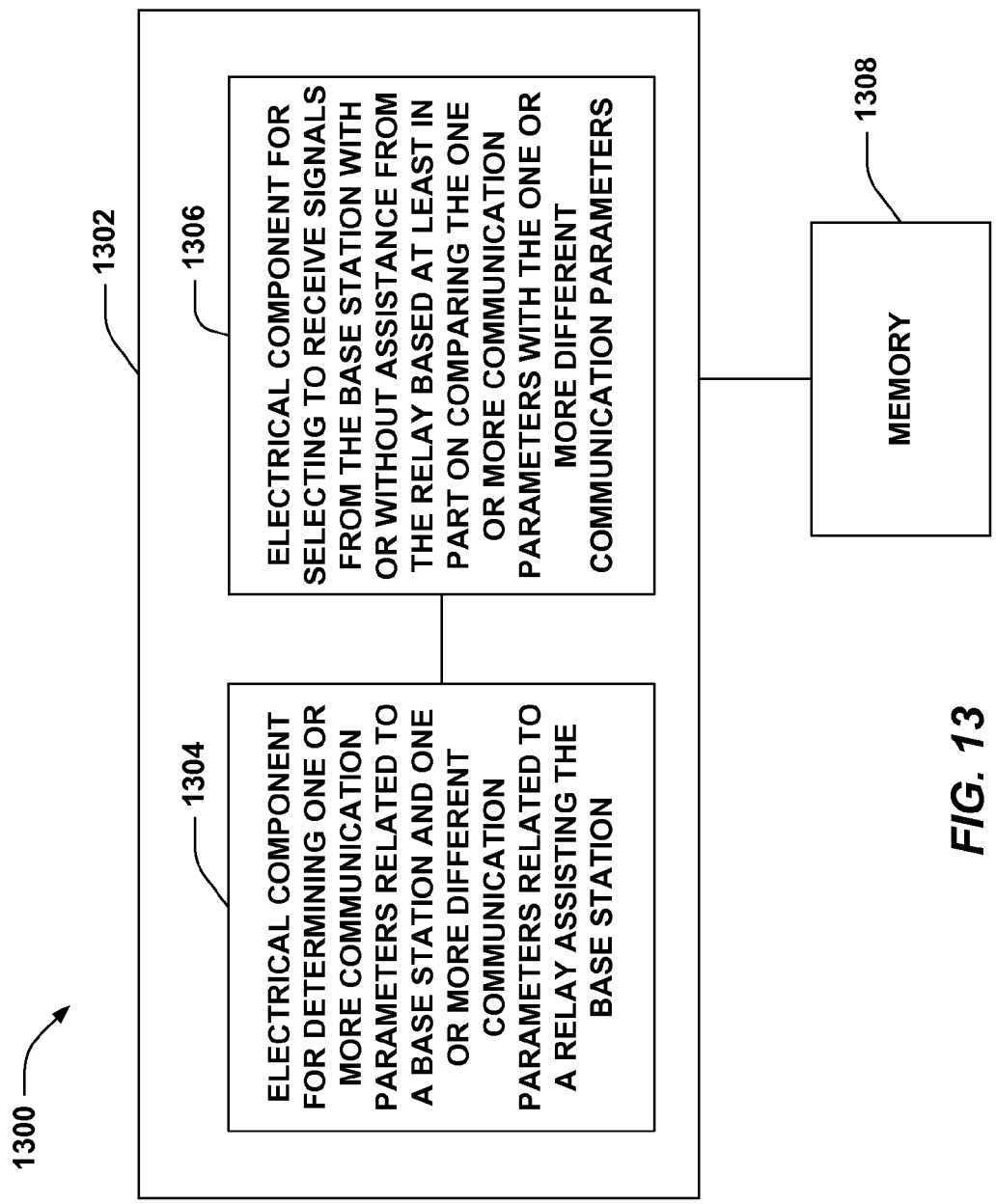
FIG. 13 illustrates an example system for selecting whether to receive assistance from a relay.

With reference to FIG. 13, illustrated is a system 1300 that determines whether to utilize relay assistance. For example, system 1300 can reside at least partially within a base station, mobile device, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for determining one or more communication parameters related to a base station and one or more different communication parameters related to a relay assisting the base station 1304. As described, the communication parameters and/or different communication parameters can relate to determined or projected link rates, a geometry of the base station, etc.

Further, logical grouping 1302 can comprise an electrical component for selecting to receive signals from the base station with or without assistance from the relay based at least in part on comparing the one or more communication parameters with the one or more different communication parameters 1306. Thus, as described, where the relay has a lower link rate than the base station, the base station can be selected without relay assistance, etc. For example, electrical component 1304, in an aspect, can include a receive power determining component 408 and/or link rate projecting component 410, as described above. Furthermore, electrical component 1306, in an aspect, can include a serving cell determining component 413. Additionally, system 1300 can include a memory 1308 that retains instructions for executing functions associated with the electrical components 1304 and 1306. While shown as being external to memory 1308, it is to be understood that one or more of the electrical components 1304 and 1306 can exist within memory 1308.

In one example, electrical components 1304 and 1306 can comprise at least one processor, or each electrical component 1304 and 1306 can be a corresponding module of at least one processor. Moreover, in an additional or alternative example, electrical components 1304 and 1306 can be a computer program product comprising a computer readable medium, where each electrical component 1304 and 1306 can be corresponding code.

Figure 14:
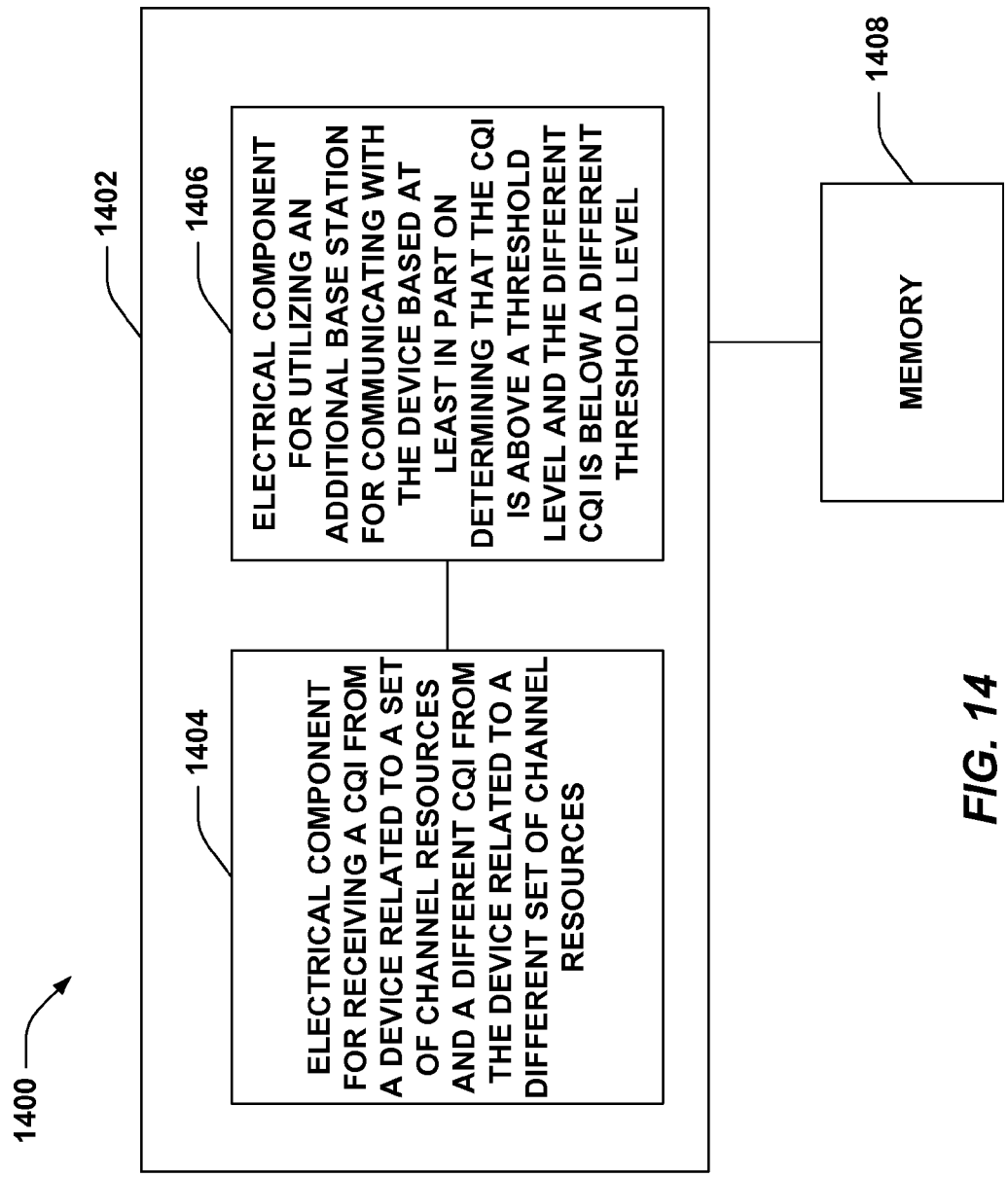
FIG. 14 illustrates an example system that employs an additional base station to serve a device.

Illustrated in FIG. 14 is a system 1400 that utilizes an additional base station for communicating with a device. For example, system 1400 can reside at least partially within a base station, mobile device, etc. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for receiving a CQI from a device related to a set of channel resources and a different CQI from the device related to a different set of channel resources 1404. As described, the CQI and different CQI can be different based at least in part on relay assistance over a link related to one of the CQIs.

Moreover, logical grouping 1402 can include an electrical component for utilizing an additional base station for communicating with the device based at least in part on determining that the CQI is above a threshold level and the different CQI is below a different threshold level 1406. As described, electrical component 1406 can utilize the additional base station based at least in part on coordinating SFN/MIMO resources with the additional base station, employing the additional base station to serve the device, and/or the like, as described. For example, electrical component 1404 can include a CQI receiving component 510, as described above. In addition, for example, electrical component 1406, in an aspect, can include a base station employing component 512, as described above. Additionally, system 1400 can include a memory 1408 that retains instructions for executing functions associated with the electrical components 1404 and 1406. While shown as being external to memory 1408, it is to be understood that one or more of the electrical components 1404 and 1406 can exist within memory 1408.

In one example, electrical components 1404 and 1406 can comprise at least one processor, or each electrical component 1404 and 1406 can be a corresponding module of at least one processor. Moreover, in an additional or alternative example, electrical components 1404 and 1406 can be a computer program product comprising a computer readable medium, where each electrical component 1404 and 1406 can be corresponding code.

Figure 15:
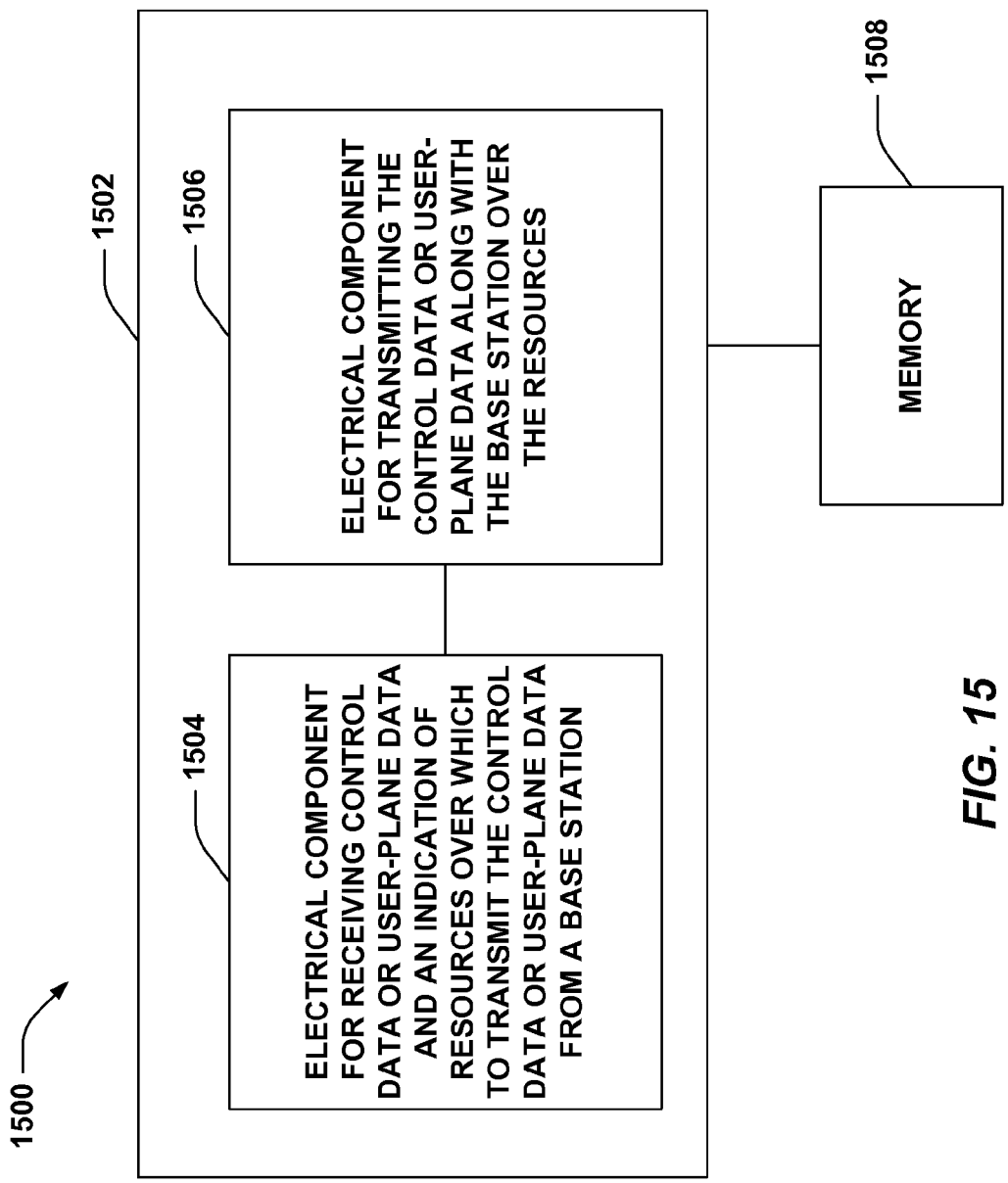
FIG. 15 illustrates an example system that assists a base station in serving a device.

Referring to FIG. 15, illustrated is a system 1500 that assists a base station in serving a device. For example, system 1500 can reside at least partially within a base station, mobile device, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for receiving control data or user-plane data and an indication of resources over which to transmit the control data or user-plane data from a base station 1504. As described, the information can be received over an X2 interface. In addition, for example, electrical component 1504 can determine the indication of resources based at least in part on decoding a portion of the control data or other control data related to a device.

Moreover, logical grouping 1502 can include an electrical component for transmitting the control data or user-plane data along with the base station over the resources 1506. For example, electrical component 1504 can include a control/data receiving component 524, as described above. In addition, for example, electrical component 1506, in an aspect, can include a data communicating component 530, as described above. Additionally, system 1500 can include a memory 1508 that retains instructions for executing functions associated with the electrical components 1504 and 1506. While shown as being external to memory 1508, it is to be understood that one or more of the electrical components 1504 and 1506 can exist within memory 1508.

In one example, electrical components 1504 and 1506 can comprise at least one processor, or each electrical component 1504 and 1506 can be a corresponding module of at least one processor. Moreover, in an additional or alternative example, electrical components 1504 and 1506 can be a computer program product comprising a computer readable medium, where each electrical component 1504 and 1506 can be corresponding code.

Figure 16:
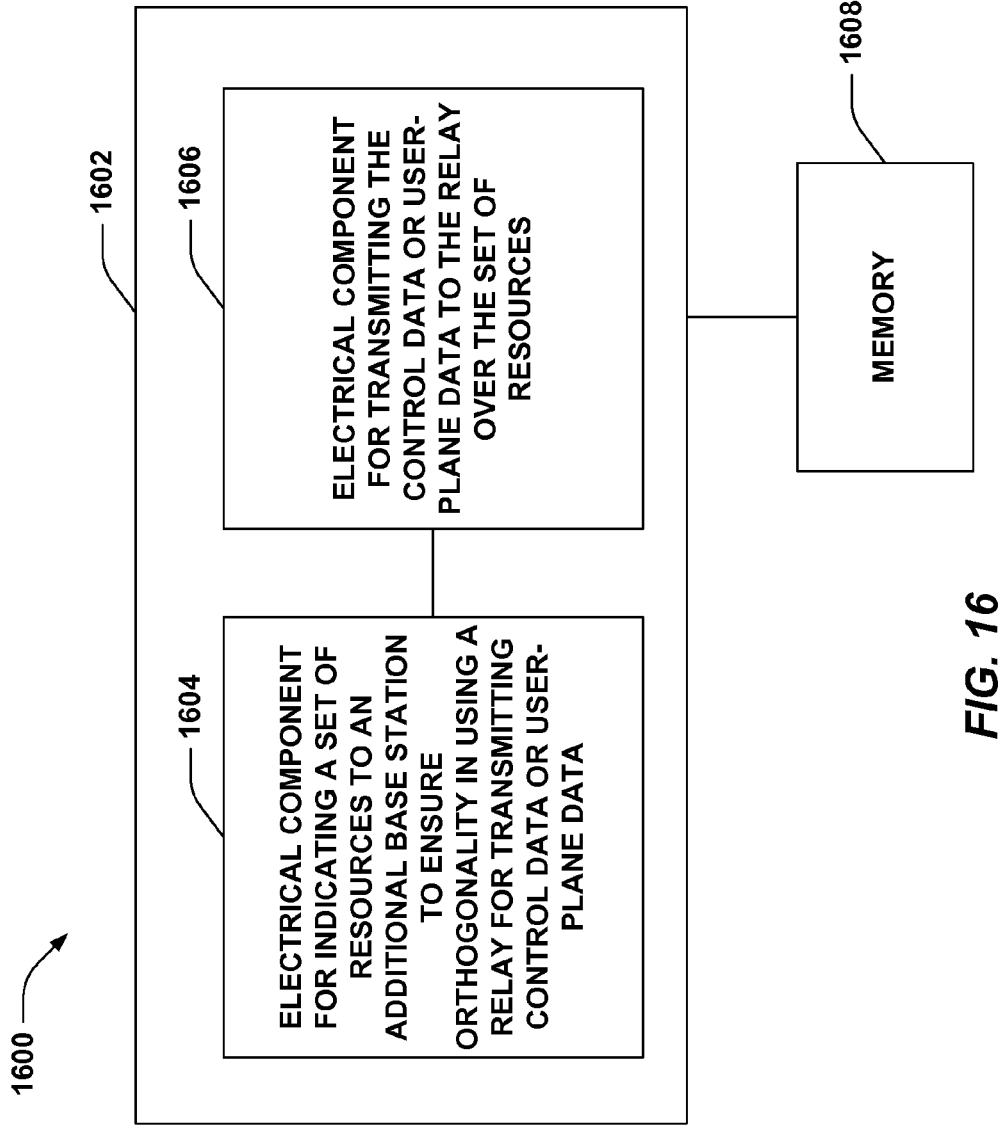
FIG. 16 illustrates an example system that jointly serves a relay.

With reference to FIG. 16, illustrated is a system 1600 that coordinates resources for jointly using a relay. For example, system 1600 can reside at least partially within a base station, mobile device, etc. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for indicating a set or resources to an additional base station to ensure orthogonality in using a relay for transmitting control data or user-plane data 1604. As described, this can be part of a process to negotiate resources with the additional base station for jointly utilizing the relay.

Further, logical grouping 1602 can comprise an electrical component for transmitting control data or user-plane data to the relay over the set of resources 1606. As described, for example, the relay can be jointly served by system 1600 and the additional base station. For example, in an aspect, electrical component 1604 can include relay resource coordinating component 610 and/or 614, as described above. In addition, for example, electrical component 1606, in an aspect, can include data communicating component 612 and/or 616, as described above. Additionally, system 1600 can include a memory 1608 that retains instructions for executing functions associated with the electrical components 1604 and 1606. While shown as being external to memory 1608, it is to be understood that one or more of the electrical components 1604 and 1606 can exist within memory 1608.

In one example, electrical components 1604 and 1606 can comprise at least one processor, or each electrical component 1604 and 1606 can be a corresponding module of at least one processor. Moreover, in an additional or alternative example, electrical components 1604 and 1606 can be a computer program product comprising a computer readable medium, where each electrical component 1604 and 1606 can be corresponding code.

Figure 17:
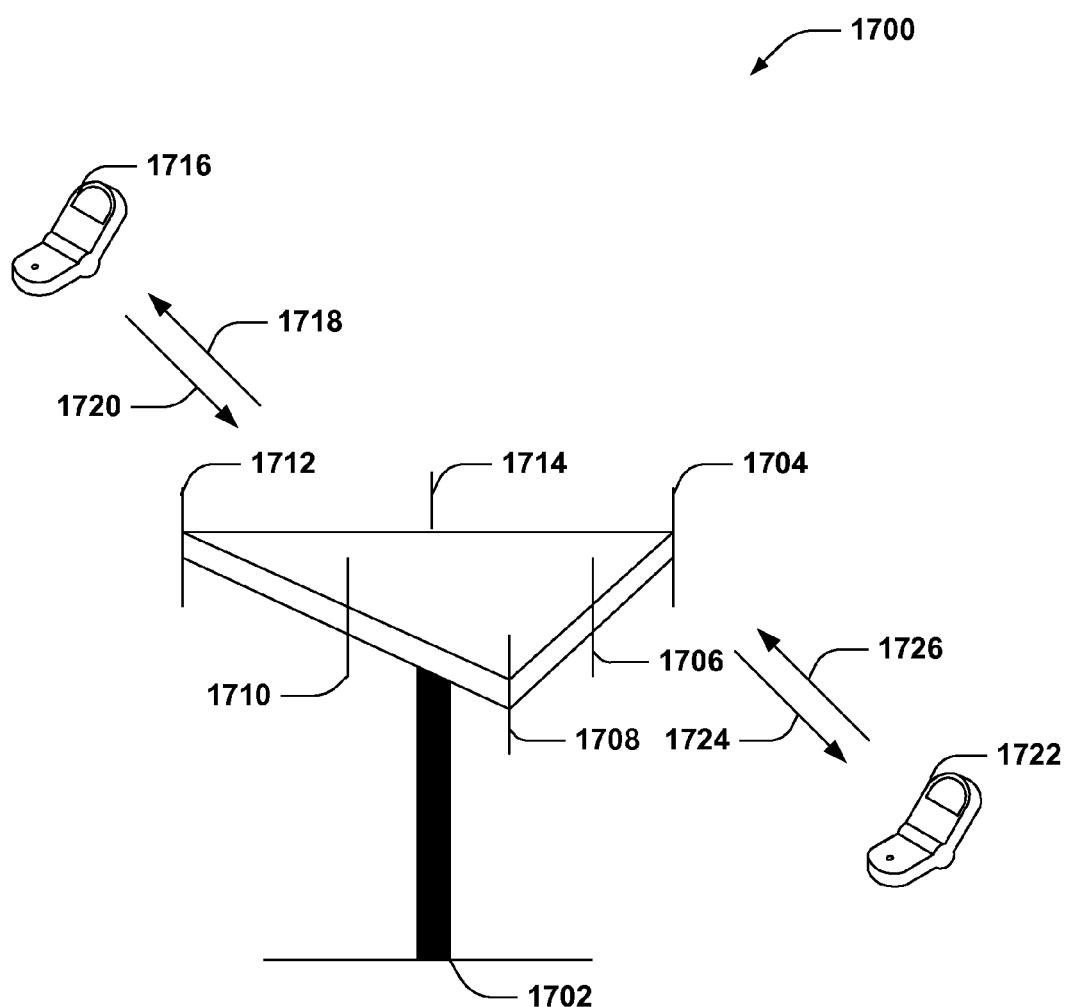
FIG. 17 illustrates an example wireless communication system in accordance with various aspects set forth herein.

Referring now to FIG. 17, a wireless communication system 1700 is illustrated in accordance with various embodiments presented herein. System 1700 comprises a base station 1702 that can include multiple antenna groups. For example, one antenna group can include antennas 1704 and 1706, another group can comprise antennas 1708 and 1710, and an additional group can include antennas 1712 and 1714. Two antennas are illustrated for each antenna group; however, more or fewer antennas can be utilized for each group. Base station 1702 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1702 can communicate with one or more mobile devices such as mobile device 1716 and mobile device 1722; however, it is to be appreciated that base station 1702 can communicate with substantially any number of mobile devices similar to mobile devices 1716 and 1722. Mobile devices 1716 and 1722 can be, for example, cellular phones, smart phones, laptops, handheld communication devices, handheld computing devices, satellite radios, global positioning systems, PDAs, and/or any other suitable device for communicating over wireless communication system 1700. As depicted, mobile device 1716 is in communication with antennas 1712 and 1714, where antennas 1712 and 1714 transmit information to mobile device 1716 over a forward link 1718 and receive information from mobile device 1716 over a reverse link 1720. Moreover, mobile device 1722 is in communication with antennas 1704 and 1706, where antennas 1704 and 1706 transmit information to mobile device 1722 over a forward link 1724 and receive information from mobile device 1722 over a reverse link 1726. In a frequency division duplex (FDD) system, forward link 1718 can utilize a different frequency band than that used by reverse link 1720, and forward link 1724 can employ a different frequency band than that employed by reverse link 1726, for example. Further, in a time division duplex (TDD) system, forward link 1718 and reverse link 1720 can utilize a common frequency band and forward link 1724 and reverse link 1726 can utilize a common frequency band.

Each group of antennas and/or the area in which they are designated to communicate can be referred to as a sector of base station 1702. For example, antenna groups can be designed to communicate to mobile devices in a sector of the areas covered by base station 1702. In communication over forward links 1718 and 1724, the transmitting antennas of base station 1702 can utilize beamforming to improve signal-to-noise ratio of forward links 1718 and 1724 for mobile devices 1716 and 1722. Also, while base station 1702 utilizes beamforming to transmit to mobile devices 1716 and 1722 scattered randomly through an associated coverage, mobile devices in neighboring cells can be subject to less interference as compared to a base station transmitting through a single antenna to all its mobile devices. Moreover, mobile devices 1716 and 1722 can communicate directly with one another using a peer-to-peer or ad hoc technology as depicted. According to an example, system 1700 can be a multiple-input multiple-output (MIMO) communication system.

Figure 18:
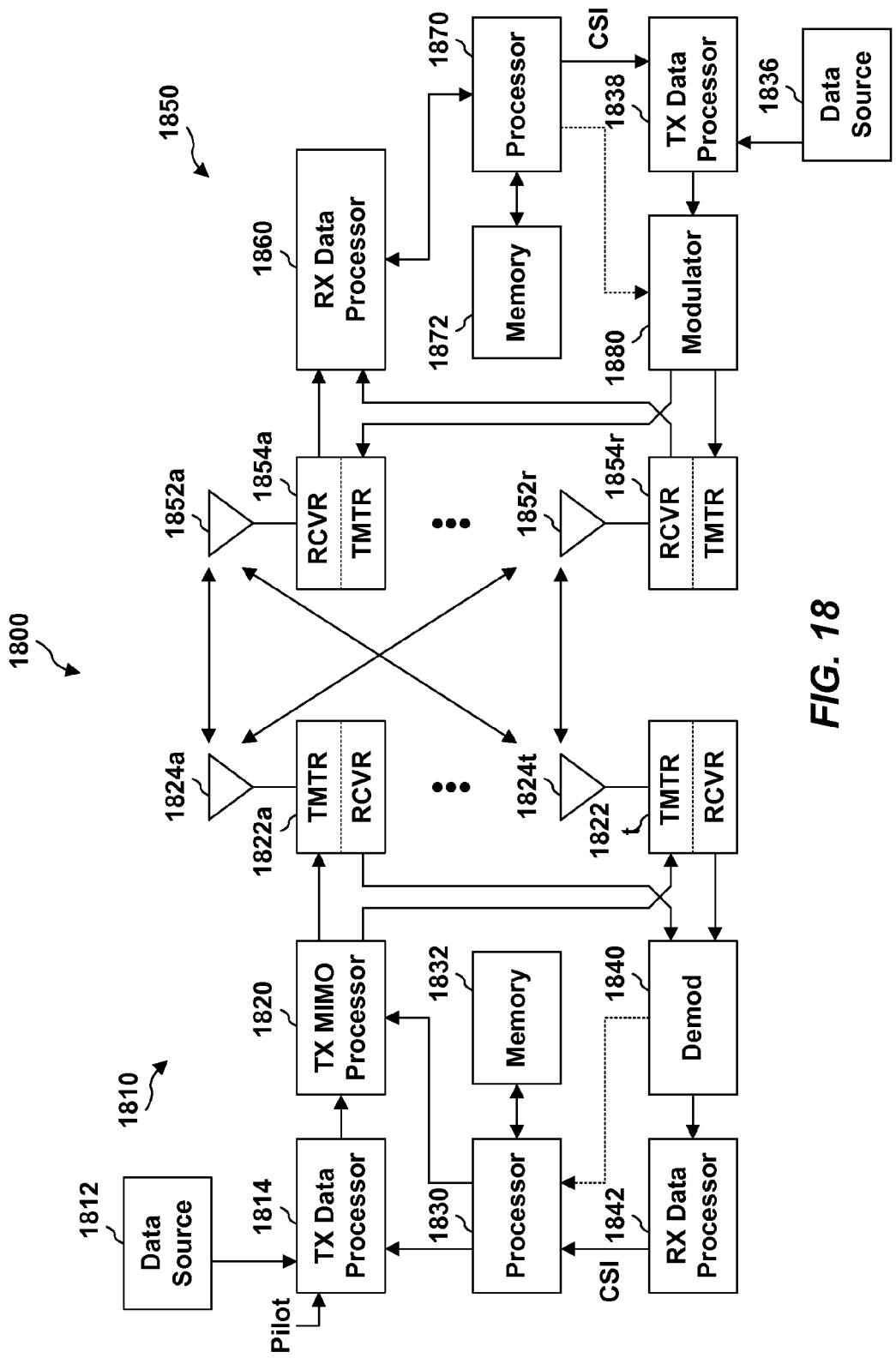
FIG. 18 illustrates an example wireless network environment that can be employed in conjunction with the various systems and methods described herein.

FIG. 18 shows an example wireless communication system 1800. The wireless communication system 1800 depicts one base station 1810 and one mobile device 1850 for sake of brevity. However, it is to be appreciated that system 1800 can include more than one base station and/or more than one mobile device, wherein additional base stations and/or mobile devices can be substantially similar or different from example base station 1810 and mobile device 1850 described below. In addition, it is to be appreciated that base station 1810 and/or mobile device 1850 can employ the systems (FIGS. 1-6 and 12-17), mobile devices, (FIG. 11), and/or methods (FIGS. 7-10) described herein to facilitate wireless communication there between. For example, components or functions of the systems and/or methods described herein can be part of a memory 1832 and/or 1872 or processors 1830 and/or 1870 described below, and/or can be executed by processors 1830 and/or 1870 to perform the disclosed functions.

At base station 1810, traffic data for a number of data streams is provided from a data source 1812 to a transmit (TX) data processor 1814. According to an example, each data stream can be transmitted over a respective antenna. TX data processor 1814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1830.

The modulation symbols for the data streams can be provided to a TX MIMO processor 1820, which can further process the modulation symbols (e.g., for OFDM). TX MIMO processor 1820 then provides $N_T$ modulation symbol streams to $N_T$ transmitters (TMTR) 1822a through 1822t. In various embodiments, TX MIMO processor 1820 applies beamforming weights to the symbols of the data streams and to the antenna from which the symbol is being transmitted.

Each transmitter 1822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1822a through 1822t are transmitted from $N_T$ antennas 1824a through 1824t, respectively.

At mobile device 1850, the transmitted modulated signals are received by $N_R$ antennas 1852a through 1852r and the received signal from each antenna 1852 is provided to a respective receiver (RCVR) 1854a through 1854r. Each receiver 1854 conditions (e.g., filters, amplifies, and downconverts) a respective signal, digitizes the conditioned signal to provide samples, and further processes the samples to provide a corresponding "received" symbol stream.

An RX data processor 1860 can receive and process the $N_R$ received symbol streams from $N_R$ receivers 1854 based on a particular receiver processing technique to provide $N_T$ "detected" symbol streams. RX data processor 1860 can demodulate, deinterleave, and decode each detected symbol stream to recover the traffic data for the data stream. The processing by RX data processor 1860 is complementary to that performed by TX MIMO processor 1820 and TX data processor 1814 at base station 1810.

The reverse link message can comprise various types of information regarding the communication link and/or the received data stream. The reverse link message can be processed by a TX data processor 1838, which also receives traffic data for a number of data streams from a data source 1836, modulated by a modulator 1880, conditioned by transmitters 1854a through 1854r, and transmitted back to base station 1810.

At base station 1810, the modulated signals from mobile device 1850 are received by antennas 1824, conditioned by receivers 1822, demodulated by a demodulator 1840, and processed by a RX data processor 1842 to extract the reverse link message transmitted by mobile device 1850. Further, processor 1830 can process the extracted message to determine which precoding matrix to use for determining the beamforming weights.

Processors 1830 and 1870 can direct (e.g., control, coordinate, manage, etc.) operation at base station 1810 and mobile device 1850, respectively. Respective processors 1830 and 1870 can be associated with memory 1832 and 1872 that store program codes and data. Processors 1830 and 1870 can also perform computations to derive frequency and impulse response estimates for the uplink and downlink, respectively.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for utilizing another base station for communicating with a device, comprising:
   receiving a first channel quality indicator (CQI) from a device related to a set of user-plane data channel resources for communicating user-plane data and a second CQI from the device related to a set of control data channel resources for communicating control data;
   determining that the first CQI is above a first threshold level and the second CQI is below a second threshold level different from the first threshold level; and
   utilizing an additional base station for communicating with the device based at least in part on the determining that the first CQI is above the first threshold level and the second CQI is below the second threshold level, wherein the additional base station is configured to communicate the control data with the device.

2. The method of claim 1, wherein the utilizing the additional base station comprises forwarding the control data or the user-plane data related to the device to the additional base station.

3. The method of claim 2, wherein the utilizing the additional base station further comprises coordinating resources with the additional base station to provide network multiple-input multiple-output or single frequency network communications to the device.

4. The method of claim 2, wherein the control data comprises an indication of resources assigned to the device for receiving at least a portion of the user-plane data.

5. The method of claim 1, further comprising
   receiving an indication of resources and corresponding user-plane data from the additional base station; and
   transmitting the corresponding user-plane data to the device according to the indication of resources.

6. An apparatus for utilizing another base station for communicating with a device, comprising:
   at least one processor configured to:
   receive a first channel quality indicator (CQI) from a device related to a set of user-plane data channel resources for communicating user-plane data and a second CQI from the device related to a set of control data channel resources for communicating control data;
   determine that the first CQI is above a first threshold level and the second CQI is below a second threshold level different from the first threshold level; and
   utilize an additional base station for communicating with the device based at least in part on the at least one processor determining that the first CQI is above the first threshold level and the second CQI is below the second threshold level, wherein the additional base station is configured to communicate the control data with the device; and
   a memory coupled to the at least one processor.

7. The apparatus of claim 6, wherein the at least one processor is further configured to utilize the additional base station at least in part by forwarding the control data or the user-plane data related to the device to the additional base station.

8. The apparatus of claim 7, wherein the at least one processor is further configured to utilize the additional base station at least in part by coordinating resources with the additional base station to provide network multiple-input multiple-output or single frequency network communications to the device.

9. The apparatus of claim 7, wherein the control data comprises an indication of resources assigned to the device for receiving at least a portion of the user-plane data.

10. The apparatus of claim 6, wherein the at least one processor is further configured to:
    receive an indication of resources and corresponding user-plane data from the additional base station; and
    transmit the corresponding user-plane data to the device according to the indication of resources.

11. An apparatus for utilizing another base station for communicating with a device, comprising:
    means for receiving a first channel quality indicator (CQI) from a device related to a set of user-plane data channel resources for communicating user-plane data and a second CQI from the device related to a set of control data channel resources for communicating control data; and
    means for utilizing an additional base station for communicating with the device based at least in part on determining that the first CQI is above a first threshold level and the second CQI is below a second threshold level different from the first threshold level, wherein the additional base station is configured to communicate the control data with the device.

12. The apparatus of claim 11, wherein the means for utilizing comprises means for forwarding the control data or the user-plane data related to the device to the additional base station.

13. The apparatus of claim 12, wherein the means for utilizing comprises means for coordinating resources with the additional base station to provide network multiple-input multiple-output or single frequency network communications to the device.

14. The apparatus of claim 12, wherein the control data comprises an indication of resources assigned to the device for receiving at least a portion of the user-plane data.

15. The apparatus of claim 11, further comprising:
    means for receiving an indication of resources and corresponding user-plane data from the additional base station; and
    means for transmitting the corresponding user-plane data to the device according to the indication of resources.

16. A non-transitory computer-readable medium storing computer executable code for wireless communication, comprising:
    code for causing at least one computer to receive a first channel quality indicator (CQI) from a device related to a set of user-plane data channel resources for communicating user-plane data and a second CQI from the device related to a set of control data channel resources for communicating control data;
    code for causing the at least one computer to determine that the first CQI is above a first threshold level and the second CQI is below a second threshold level different from the first threshold level; and
    code for causing the at least one computer to utilize an additional base station for communicating with the device based at least in part on the code for causing the at least one computer to determine that the first CQI is above the first threshold level and the second CQI is below the second threshold level, wherein the additional base station is configured to communicate the control data with the device.

17. The non-transitory computer-readable medium of claim 16, wherein the code for causing the at least one computer to utilize the additional base station at least in part by forwarding the control data or the user-plane data related to the device to the additional base station.

18. The non-transitory computer-readable medium of claim 17, wherein the code for causing the at least one computer to utilize the additional base station at least in part by coordinating resources with the additional base station to provide network multiple-input multiple-output or single frequency network communications to the device.

19. The non-transitory computer-readable medium of claim 17, wherein the control data comprises an indication of resources assigned to the device for receiving at least a portion of the user-plane data.

20. The non-transitory computer-readable medium of claim 16, further comprising:
    code for causing the at least one computer to receive an indication of resources and corresponding user-plane data from the additional base station; and
    code for causing the at least one computer to transmit the corresponding user-plane data to the device according to the indication of resources.

21. An apparatus for utilizing another base station for communicating with a device, comprising:
    a channel quality indicator (CQI) receiving component for obtaining a first CQI from a device related to a set of user-plane data channel resources for communicating user-plane data and a second CQI from the device related to a set of control data channel resources for communicating control data; and
    a base station employing component for utilizing an additional base station for communicating with the device based at least in part on determining that the first CQI is above a first threshold level and the second CQI is below a second threshold level different from the first threshold level, wherein the additional base station is configured to communicate the control data with the device.

22. The apparatus of claim 21, wherein the base station employing component comprises a control/data forwarding component for forwarding the control data or the user-plane data related to the device to the additional base station.

23. The apparatus of claim 22, wherein the base station employing component comprises a single frequency network (SFN)/multiple-input multiple-output (MIMO) component for coordinating resources with the additional base station to provide network MIMO or SFN communications to the device.

24. The apparatus of claim 22, wherein the control data comprises an indication of resources assigned to the device for receiving at least a portion of the user-plane data.

25. The apparatus of claim 21, further comprising:
    a data receiving component for obtaining an indication of resources and corresponding user-plane data from the additional base station; and
    a data communicating component for transmitting the corresponding user-plane data to the device according to the indication of resources.

\* \* \* \* \*